US007952766B2

(12) United States Patent
Moroo et al.

(10) Patent No.: US 7,952,766 B2
(45) Date of Patent: May 31, 2011

(54) METHOD AND APPARATUS FOR PROCESSING IMAGE DATA AND COMPUTER PROGRAM

(75) Inventors: Jun Moroo, Kawasaki (JP); Tsugio Noda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1018 days.

(21) Appl. No.: 10/808,563

(22) Filed: Mar. 25, 2004

(65) Prior Publication Data

US 2005/0117774 A1 Jun. 2, 2005

(30) Foreign Application Priority Data

Nov. 28, 2003 (JP) ................................. 2003-399579

(51) Int. Cl.
*H04N 1/46* (2006.01)
*G03F 3/08* (2006.01)

(52) U.S. Cl. ........................ 358/3.28; 358/515; 358/518

(58) Field of Classification Search ................. 358/3.28, 358/504, 518, 1.9, 515; 382/100
See application file for complete search history.

(56) References Cited

U.S. PATENT DOCUMENTS

| 5,636,292 A | 6/1997 | Rhoads | 382/232 |
| 5,841,978 A | 11/1998 | Rhoads | 395/200.47 |
| 5,946,414 A | 8/1999 | Cass et al. | 382/183 |
| 6,141,441 A * | 10/2000 | Cass et al. | 382/166 |
| 6,256,110 B1 | 7/2001 | Yoshitani | 358/1.9 |
| 6,438,251 B1 | 8/2002 | Yamaguchi | 382/100 |
| 7,523,311 B1 * | 4/2009 | Matsui | 713/176 |
| 2002/0040648 A1 * | 4/2002 | DeProspero et al. | 101/128.21 |
| 2002/0126316 A1 | 9/2002 | Sakaki et al. | 358/3.28 |
| 2002/0163671 A1 | 11/2002 | Takaragi | 358/3.28 |
| 2002/0164052 A1 * | 11/2002 | Reed et al. | 382/100 |

FOREIGN PATENT DOCUMENTS

| JP | 11-170630 A | 6/1999 |
| JP | 11-220607 A | 8/1999 |
| JP | 11-355554 A | 12/1999 |
| JP | 2000-115523 | 4/2000 |
| JP | 2000-158861 A | 6/2000 |
| JP | 2000-165640 A | 6/2000 |
| JP | 2000-299779 A | 10/2000 |
| JP | 2001-148776 A | 5/2001 |
| JP | 2001-203872 A | 7/2001 |
| JP | 2001-309155 A | 11/2001 |
| JP | 2002-540650 A | 11/2002 |
| WO | WO-00/44163 | * 7/2000 |
| WO | WO00/44571 | 8/2000 |

OTHER PUBLICATIONS

U.S. Appl. No. 10/642,142, filed Aug. 18, 2003, Jun Moroo et al., Fujitsu Limited.
European Patent Office, Patent Abstracts of Japan, Publication No. 2000165640, Publication Date Jun. 16, 2000.

* cited by examiner

*Primary Examiner* — James A Thompson
(74) *Attorney, Agent, or Firm* — Staas & Halsey LLP

(57) ABSTRACT

A dividing unit divides image data into a plurality of blocks. An extracting unit extracts a feature index of a first color component and a feature index of a second color component in each of the blocks. A registration unit registers information about a correspondence between the feature index of a second color component and a change in the feature index for the first color component. A code embedding unit embeds a predetermined code into the image data, by changing the feature index of the first color component based on the feature index of the second color component, using the information registered.

15 Claims, 18 Drawing Sheets

FIG.3A
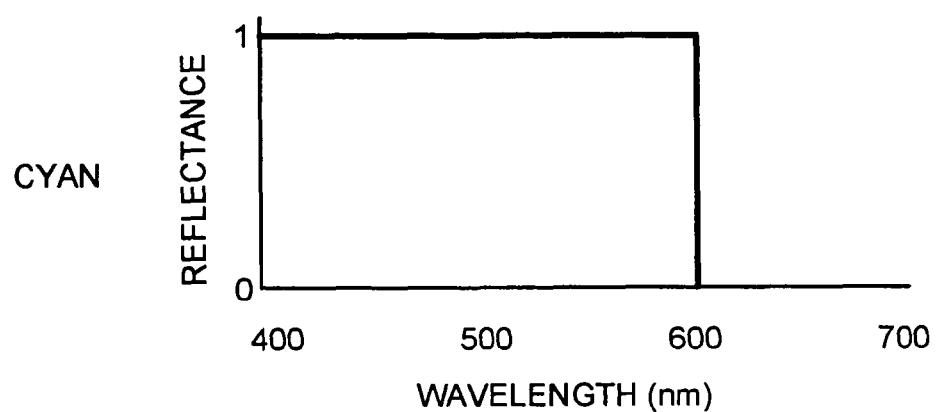
CYAN
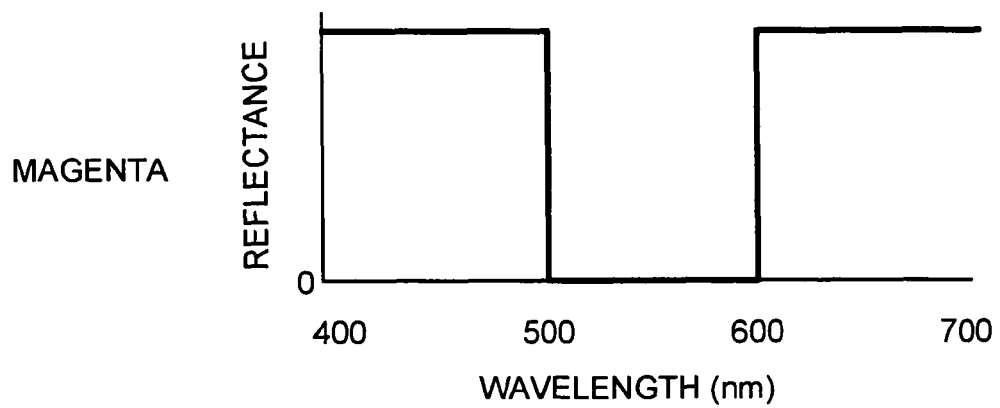
MAGENTA
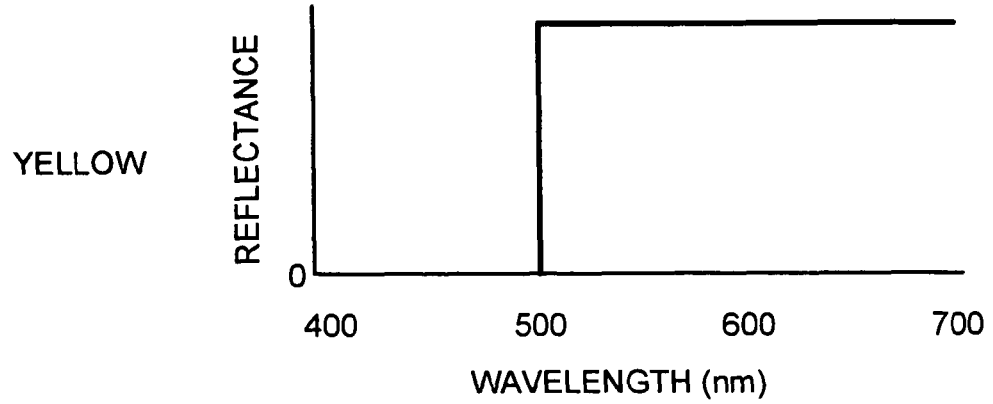
YELLOW

FIG.3B
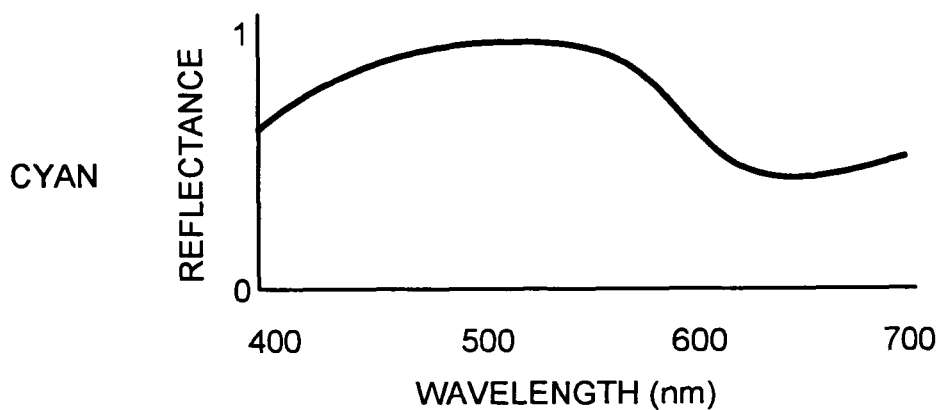
CYAN
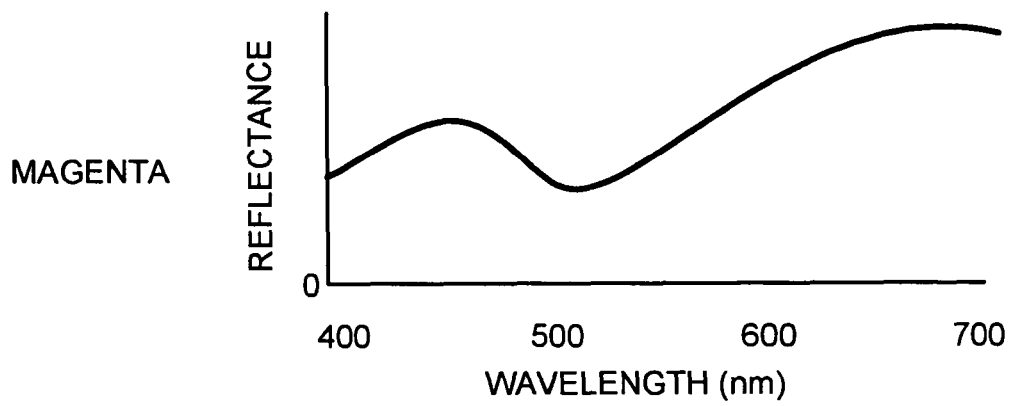
MAGENTA
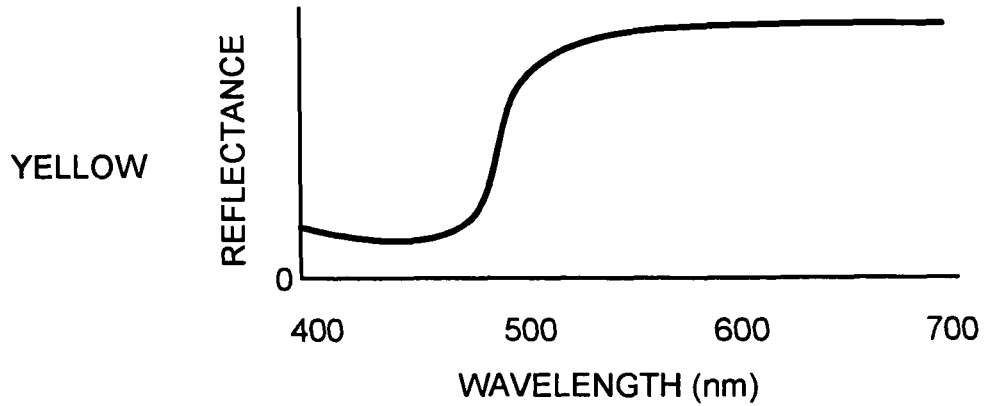
YELLOW

FIG.6

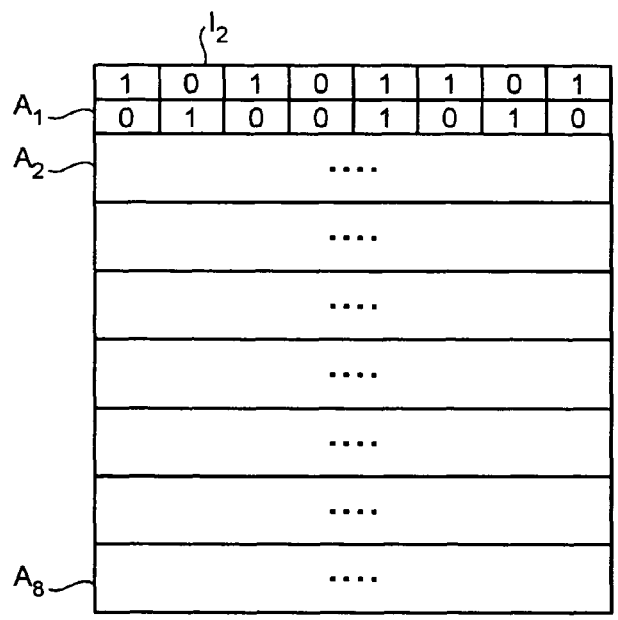

FIG.7

(A) WHEN Dyl<Dyr
  D'yl=(Dyl+Dyr)/2−T/2  ···(1)
  D'yr=(Dyl+Dyr)/2+T/2  ···(2)

(B) WHEN Dyl≧Dyr
  D'yl=(Dyl+Dyr)/2+T/2  ···(3)
  D'yr=(Dyl+Dyr)/2−T/2  ···(4)

D'yl CHANGED YELLOW LEFT-SIDE MEAN PIXEL VALUE DATA
D'yr CHANGED YELLOW RIGHT-SIDE MEAN PIXEL VALUE DATA
Dyl YELLOW LEFT-SIDE MEAN PIXEL VALUE DATA BEFORE CHANGE
Dyr YELLOW RIGHT-SIDE MEAN PIXEL VALUE DATA BEFORE CHANGE
T DIFFERENCE SET FOR EACH BLOCK (A) WHEN D'yl<D'yr AND Dml<Dmr
OR
WHEN D'yl≥D'yr AND Dml>Dmr
T = T0
= 10 ...(5)

(B) WHEN D'yl≧D'yr AND Dml≧Dmr
OR
WHEN D'yl≦D'yr AND Dml≦Dmr
T = T0 × (COEFFICIENT)
...(6)

| MAGENTA LEFT-SIDE MEAN PIXEL VALUE | COEFFICIENT |
|---|---|
| 0 TO 25 | 3 |
| 26 TO 50 | 2 |
| 51 TO 200 | 1 |
| 201 TO 255 | 2 |

| LOW-PIXEL VALUE-SIDE MAGENTA MEAN DENSITY | MAGENTA MEAN PIXEL VALUE DIFFERENCE | | | |
|---|---|---|---|---|
| | 0 TO 10 | 11 TO 20 | 21 TO 40 | 41 TO 255 |
| 0 TO 25 | 1 | 2 | 3 | 5 |
| 26 TO 50 | 1 | 1 | 2 | 3 |
| 51 TO 200 | 1 | 1 | 1 | 1 |
| 201 TO 255 | 1 | 2 | 3 | 3 |

METHOD AND APPARATUS FOR PROCESSING IMAGE DATA AND COMPUTER PROGRAM

BACKGROUND OF THE INVENTION

1) Field of the Invention

This invention relates to embedding a predetermined code into one color component of image data.

2) Description of the Related Art

As disclosed in drawings of the specification of U.S. Pat. No. 5,636,292 and Japanese Patent Application Laid-Open No. 2000-299779, a technique for embedding a code (different data) into image data or voice data has been conventionally applied to counterfeit forgery, to prevent illegal use, and to provide other services.

Because this technique is used for security purposes, conventional methods have been used against tampering of data. For example, quite complicated methods such as a method of arranging identical codes in an image in a distributed manner, and an electronic watermark technique of inserting a code in a frequency region using FFT (Fast Fourier Transform) have been conventionally used.

The electronic watermark technique is applied to various other services. For example, the drawings of the specification of U.S. Pat. No. 5,841,978 disclose a method of reading an electronic watermark embedded in printed matter and displaying a specific web page.

However, the conventional electronic watermark technique is required to perform an enormous amount of FFT calculation to insert the code into the frequency region. Portable information devices such as a cellular phone, a PHS (Personal Handyphone System), or a PDA (Personal Digital Assistant) include resources, such as a memory and a processor, having limited processing performance. Therefore, in a portable information device, it is difficult to carry out embedding code into and reading out the code from the image data within practical processing time.

Japanese Patent Application Laid-Open No. 2000-165640 discloses an electronic watermark technique that does not perform FFT calculation. The image processing apparatus in this patent literature embeds additional data into Y (yellow) component of image data printed in colors of CMYK (cyan, magenta, yellow, and black).

Specifically, a plurality of patterns are embedded into the Y component image data, which is visually inconspicuous, and a "0" or "1" code is discriminately set depending on the type of pattern embedded. While embedding patterns, if densities of CMK components of the image data are higher, amplitude of pixel value fluctuation of the Y component is set higher. By doing so, even if the densities of the CMK components are high in the printed image, the embedded patterns can be easily detected.

However, reflected wavelengths of the CM components in actual print inks are not reflected wavelengths of pure CM components, but include reflected wavelengths of the Y component as unnecessary reflected wavelengths. Therefore, the prior art disclosed by the Japanese Patent Application Laid-Open No. 2000-165640 has a disadvantage in that the pixel value of the Y component in the actual printed image changes and the change in pixel value adversely affects accuracy of detecting the code from the Y component in the printed image.

Furthermore, at the time of printing the image data, a printer driver adjusts proportions of the CMK components so as to provide a finer image. If the pixel value of the Y component used to embed the code is set based on the densities of the CMK component of the image data, the pixel value of the Y component in the actual printed image further changes due to the adjustment done by the printer driver. As a result, it is difficult to set the pixel value of the Y component that is used to embed the code.

To overcome this problem, the amplitude of the pixel value fluctuation of the Y component may well be set high in advance. However, there is a disadvantage in that the patterns embedded into the image data are conspicuous on the printed image. The prior art disclosed in the Japanese Patent Application Laid-Open No. 2000-165640, therefore, fails to show a specific method of setting appropriate amplitude.

To deal appropriately with the unnecessary reflected wavelengths of the Y component included in the CM components, it is required to adjust the pixel value of the Y component embedded into the code in accordance with color characteristics of the printed image data and not color characteristics of the original image. The same is true for three primary colors RGB (Red, Green, and Blue) complementary to the colors CMY.

SUMMARY OF THE INVENTION

It is an object of the invention to at least solve the problems in the conventional technology.

An image data processing apparatus according to an aspect of the present invention includes a dividing unit that divides image data into a plurality of blocks; an extracting unit that extracts a feature index of a first color component and a feature index of a second color component in each of the blocks; a registration unit that registers information about a correspondence between the feature index of the second color component and a change in the feature index for the first color component; and a code embedding unit that embeds a predetermined code into the image data, by changing the feature index of the first color component based on the feature index of the second color component, using the information registered.

An image data processing method according to another aspect of the present invention includes dividing image data into a plurality of blocks; extracting a feature index of a first color component and a feature index of a second color component in each of the blocks; registering information about a correspondence between the feature index of the second color component and a change in the feature index for the first color component; and embedding a predetermined code into the image data, by changing the feature index of the first color component based on the feature index of the second color component, using the information registered.

A computer program according to another aspect of the present invention makes a computer realize the method according to the present invention on a computer.

The other objects, features, and advantages of the present invention are specifically set forth in or will become apparent from the following detailed descriptions of the invention when read in conjunction with the accompanying drawings.

BRIEF DESCRIPTION OF THE DRAWINGS

FIG. 3A illustrates a relationship between wavelengths of ideal ink and reflectance;

FIG. 3B illustrates a relationship between wavelengths of actual inks and reflectance;

FIG. 6 illustrates coded image data output by the encoder;

FIG. 7 is an illustration for explaining a pixel value change process performed by the encoder;

FIG. 15 illustrates coefficient information registered in a coefficient registration section;

DETAILED DESCRIPTION

Exemplary embodiments of an apparatus and a method for processing image data, and a computer program according to the present invention will be explained in detail with reference to the accompanying drawings.

Figure 1:
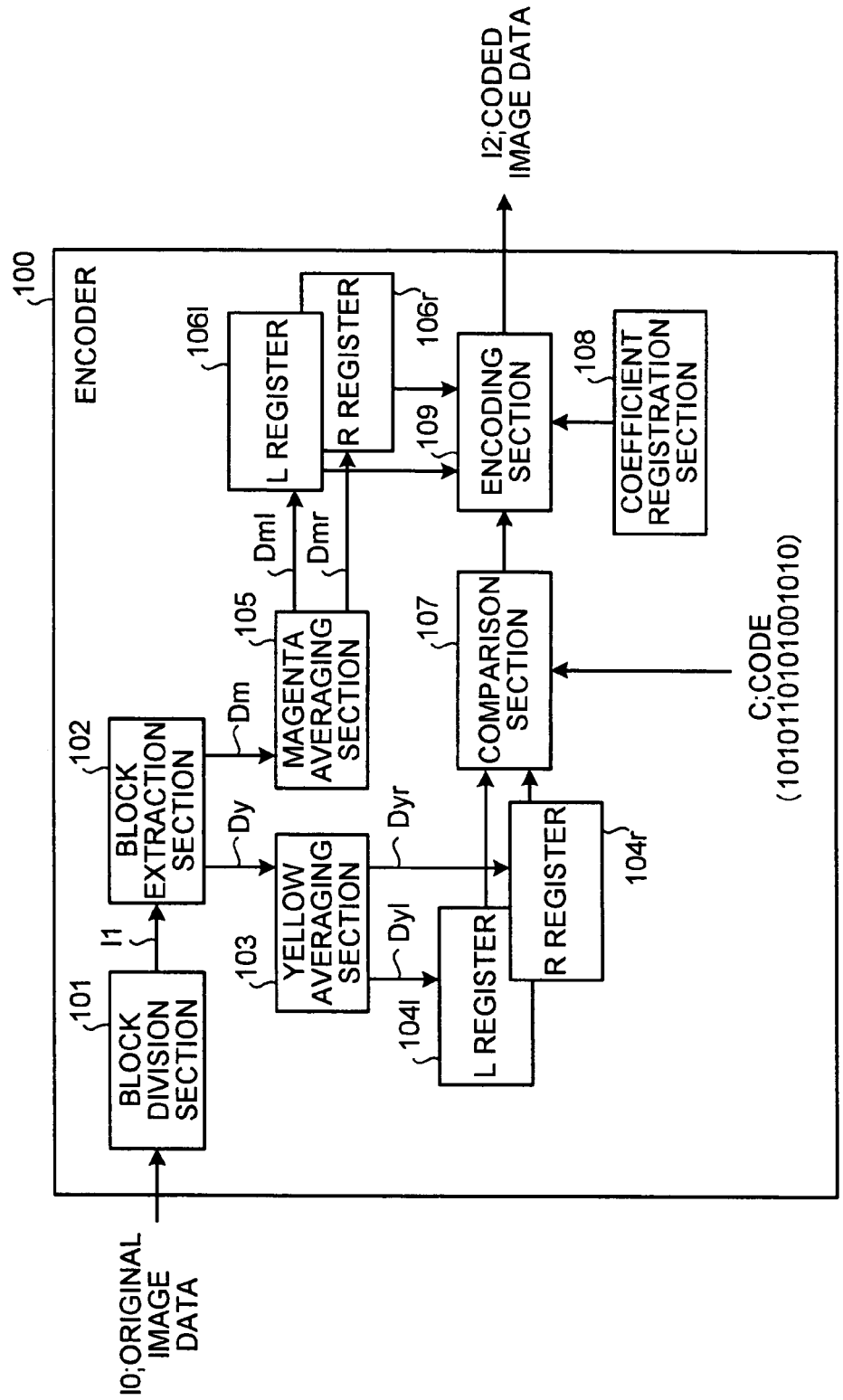
FIG. 1 is a block diagram of an encoder according to a first embodiment of the present invention.

FIG. 1 is a block diagram of the encoder 100 according to a first embodiment of the present invention. The encoder 100 embeds a code C into a yellow component of the original image data I0, and generates the coded image data I2.

The original image data I0 is generated in a predetermined format, for example, JPEG (Joint Photographic Expert Group) or TIFF (Tagged Image File Format), and with a size of 1024×1024 pixels. A code C of 16 bits (1010110101001010), for example, is embedded into the yellow component of the original image data I0.

For embedding a code into an image, a method of embedding a code into a gray-scale image (monochrome image) obtained by converting a color image to brightness, or a method of embedding a code into one of the three primary color components (a cyan component, a magenta component, and the yellow component) of the image, may be used. For example, code may be embedded into a yellow component.

Figure 2:
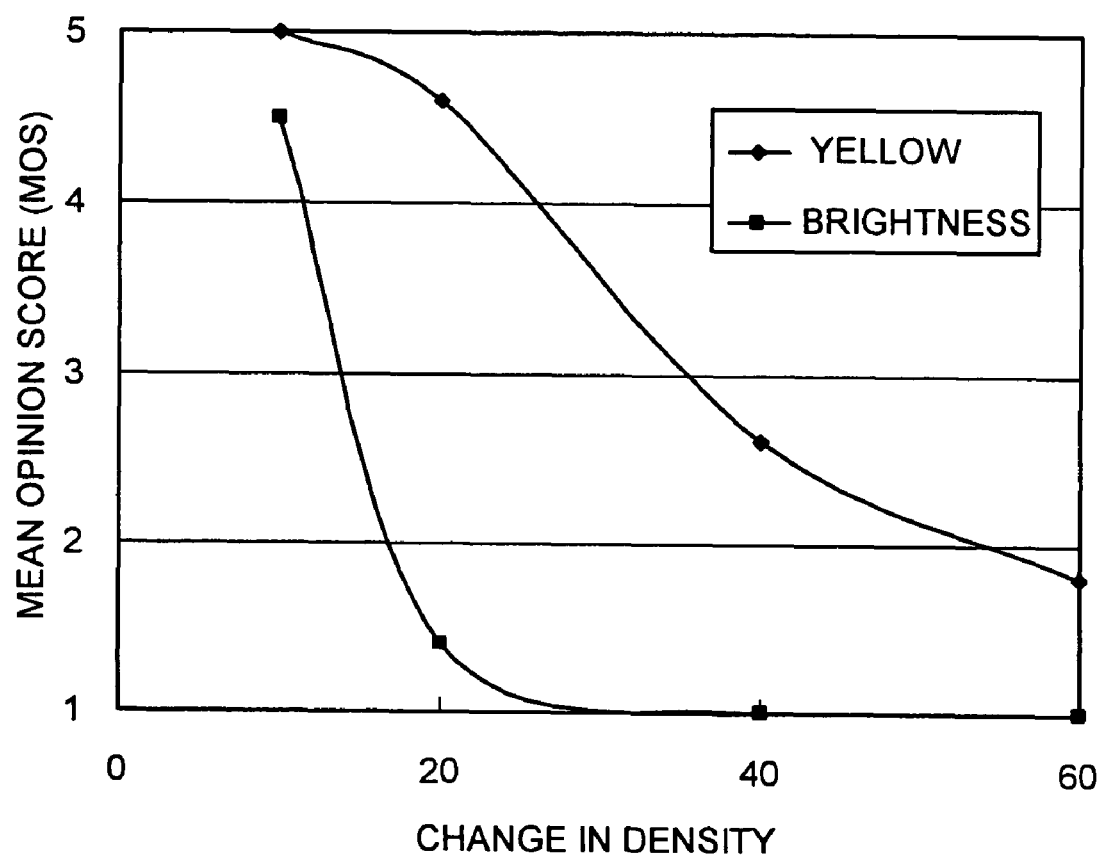
FIG. 2 is a graph illustrating a relationship between change in density of a yellow component image and a gray-scale image, and a mean opinion score (MOS)

The latter method is advantageous over the former method in that even if pixel value is changed, it is difficult for the human eye to discriminate an unchanged pixel value from a changed pixel value. FIG. 2 is a graph illustrating a relationship between a change in pixel value of a yellow component image and a gray-scale image, and an MOS (Mean Opinion Score).

This graph is obtained after a subjective evaluation method that is specified by International Commission on Illumination (ITU-T), and that is well known as an image evaluation method. According to the subjective evaluation method, if the image changed by as much as a pixel value change quantity cannot be visually discriminated from the original image, the quality of the image is evaluated as five MOS. If the difference is greater, the quality of the image is evaluated as lower MOS.

As can be seen from the graph, the yellow component (indicated as "yellow") has a higher MOS than the brightness component (indicated as "brightness") even if the change in pixel value is increased. Therefore, with the method of changing the pixel value of the yellow component, it is difficult for the human eye to discriminate the unchanged image from the changed image.

A printer prints the coded image data generated by the encoder 100, using cyan, magenta, and yellow ink. An input device such as a scanner or a camera reads the coded image data printed, and a decoder 200 (see FIG. 11) extracts the code embedded into the coded image data.

However, the magenta ink and the cyan ink used for printing include reflected wavelengths of the yellow component as unnecessary reflected wavelengths. As a result, the magenta ink and the cyan ink adversely affect extracting of the code embedded into the yellow component of the image.

FIG. 3A illustrates a relationship between wavelengths of ideal ink and reflectance. FIG. 3B illustrates a relationship between wavelengths of actual ink and reflectance. As illustrated in FIG. 3A, in ideal ink, reflectance of the cyan component and that of the magenta component do not coincide with the reflectance of the yellow component. Therefore, the cyan, magenta, and yellow components have no effect on one another.

However, in actual ink, (see FIG. 3B), the reflectance of the cyan component and that of the magenta component are not perfectly "1" or "0", unlike in FIG. 3A. A wavelength range of the yellow component is included as an unnecessary wavelength range in both, the cyan component and the magenta component. Therefore, if the code is embedded into the yellow component of the image, the influence of the unnecessary wavelength range included in the cyan component and the magenta component makes it difficult to acquire the code.

Figure 4A:
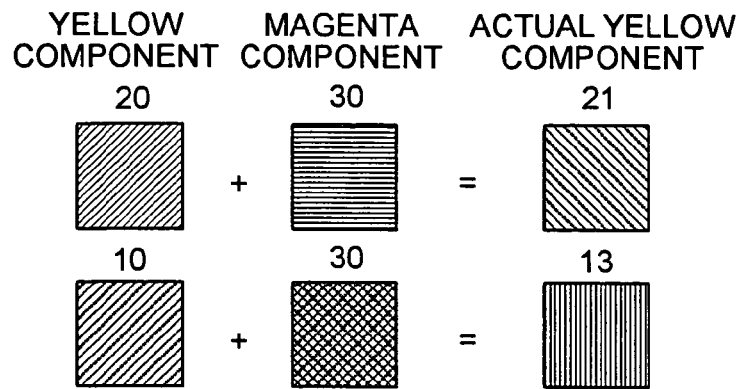
FIG. 4A illustrates an example of an actual yellow component that is generated from a yellow component and a magenta component having an unnecessary wavelength of the yellow component in its wavelength range.
Figure 4B:
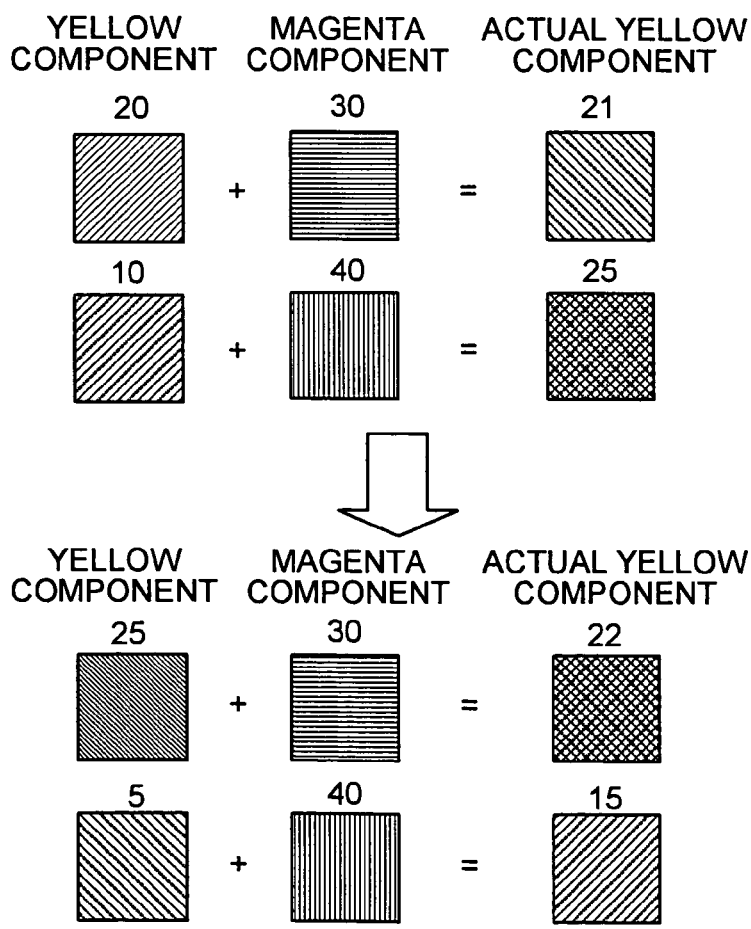
FIG. 4B illustrates an instance in which the magenta component has an effect on the yellow component.

FIG. 4A illustrates one example of an actual yellow component that is generated from the yellow component and the magenta component having an unnecessary wavelength of the yellow component in its wavelength range. FIG. 4B illustrates an instance in which the magenta component has an effect on the yellow component.

As illustrated in FIG. 4A, for the pixel value "30" of the magenta component that has an unnecessary wavelength range of the yellow component included in its wavelength range, a magnitude relationship between the densities "20" and "10" of the yellow components and the densities "21" and "13" of the actual yellow components generated, is identical. Namely, of the two cases, if the pixel value of the yellow component is high, the pixel value of the actual yellow component generated is also high.

However, as illustrated in FIG. 4B, if the pixel value of the magenta component changes from "30" to "40", for example, the magnitude relationship between the densities "20" and "10" of the yellow components and the densities "21" and "25" of the actual yellow components generated, is often reversed. This is due to the effect of the unnecessary reflected wavelengths included in the reflected wavelengths of the magenta component as explained with reference to FIG. 3B. Further, the effect of the unnecessary reflected wavelengths varies according to the type of ink.

In consideration of the above respects, the encoder 100 adjusts the densities of the yellow components by as much as predetermined quantities (changes "20" to "25" and "10" to "5") so as to satisfy the magnitude relationship between the densities of the yellow components and the densities of the actual yellow components generated from the magenta component and the yellow component.

The change in the pixel value of the yellow component is determined by experiments, or analyzing parameters of a color conversion system in a printer driver. Specifically, the change in the pixel value the yellow component corresponding to the pixel value of various magenta components is determined, so as to be able to detect the code C with higher accuracy while suppressing image degradation.

The change in the densities of the yellow components thus determined is stored in correlation to the pixel value of the respective magenta component. If the pixel value of the yellow component is to be changed, then the change in the pixel value of the yellow component corresponding to the pixel value of the magenta component is extracted, the change in the pixel value is applied to the yellow component, and the pixel value of the yellow component is thus changed.

This makes it possible to deal with the adverse effect of the unnecessary reflected wavelengths of the yellow component included in the reflected wavelengths of the magenta ink, on code detection, and to improve the code detection efficiency. Further, using the yellow component having characteristics closer to ideal characteristics for embedding code, it is possible to suppress image degradation without greatly affecting the cyan and magenta components.

Figure 5:
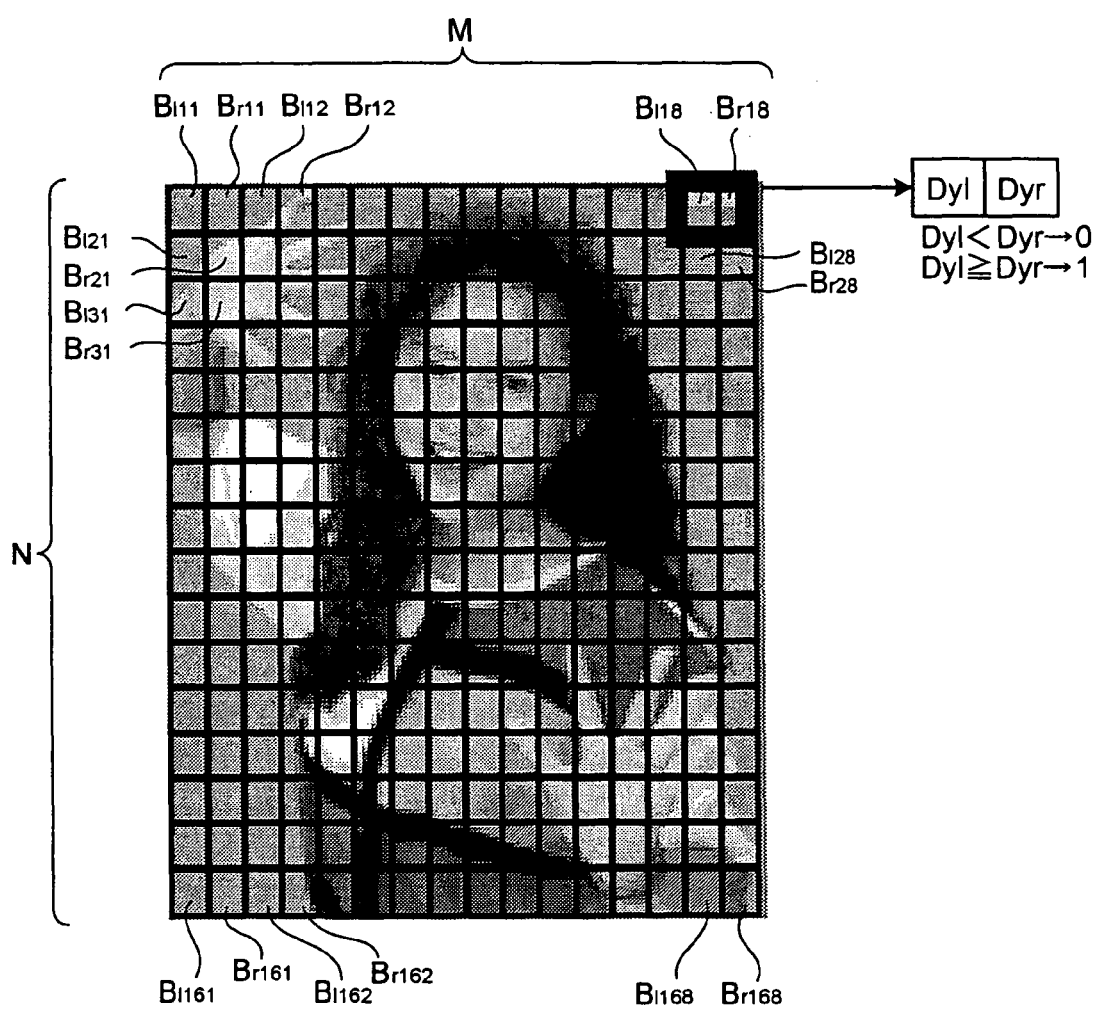
FIG. 5 illustrates block division image data output by a block division section.

Referring back to FIG. 1, a block division section 101 in the encoder 100 divides the input original image data I0 into bocks in N rows by M columns (blocks of 16 rows by 16 columns in the example illustrated in FIG. 5), and outputs the divided blocks as block division image data I1.

The block division image data I1 includes blocks $B_{l11}$, $B_{r11}$, $B_{l18}$, $B_{r18}$, $B_{l21}$, $B_{r21}$, ..., and $B_{l168}$, $B_{r168}$, i.e., 256 blocks in all. Each block has a size of 64×64 pixels.

A code of one bit is embedded into each pair of blocks (two adjacent blocks) in the block division image data I1.

Specifically, the paired blocks are the blocks $B_{l11}$ and $B_{r11}$, the block $B_{l12}$ and $B_{r12}$, ..., the blocks $B_{l18}$ and $B_{r18}$ (in a first row), the blocks $B_{l21}$ and $B_{r21}$, ..., the blocks $B_{l28}$ and $B_{r28}$ (in a second row), the blocks $B_{l161}$ and $B_{r161}$, ..., and the blocks $B_{l168}$ and $B_{r168}$ (in a sixteenth row).

As for block $B_{lxy}$ and block $B_{rxy}$ in one pair of blocks, a subscript l represents that the block is a left-side block in the pair, a subscript r represents that the block is a right-side block in the pair, a subscript x represents the row (N) of the block, and a subscript y represents the column (M) of the block.

Further, in the paired blocks, a yellow component mean pixel value as a feature index of the yellow component in the left block $B_{lxy}$ (a mean gradation of the pixels in the block) is assumed as yellow left-side mean pixel value data $D_{yl}$, and that in the right block $B_{rxy}$ is assumed as yellow right-side mean pixel value data $D_{yr}$.

If the yellow left-side mean pixel value data $D_{yl}$ is less than the yellow right-side mean pixel value data $D_{yr}$, the one-bit code embedded into the paired blocks is determined as "0" using the relational formula given below. If the yellow left-side mean pixel value data $D_{yl}$ is equal to or more than the yellow right-side mean pixel value data $D_{yr}$, the one-bit code embedded into the paired blocks is determined as "1" using the following relational formula. This process is hereinafter referred to as "bit determination".

$D_{yl} < D_{yr}$ "0"

$D_{yl} \geq D_{yr}$ "1"

In addition, in the block division image data I1, eight paired blocks (16 blocks) are present per row. Therefore, one row represents a code of eight bits. Accordingly, all rows (16 rows) represent a code of 128 bits. According to the first embodiment, the code C embedded into the block division image data I1 has 16 bits. Therefore, it is possible to embed the code C into the block division image data I1, eight (128/16) times (see FIG. 6).

Referring back to FIG. 1, a block extraction section 102 sequentially extracts the paired blocks (blocks $B_{lxy}$ and $B_{rxy}$) from the block division image data I1 (see FIG. 5) so as to follow a bit shift of the code C, and sequentially outputs pixel value distributions of the yellow component and the magenta component in the blocks $B_{lxy}$ and $B_{rxy}$ as yellow block pixel value data $D_y$ and magenta block pixel value data $D_m$, respectively.

The "bit shift of the code C" means that a bit pointer is shifted to the right, bit by bit, from leftmost bit "1" to rightmost bit "0".

A yellow averaging section 103 calculates the yellow left-side mean pixel value data $D_{yl}$ corresponding to the block $B_{lxy}$ and the yellow right-side means pixel value data $D_{yr}$ corresponding to the block $B_{rxy}$ from the magenta block pixel value data $D_m$, and sequentially stores the calculated data $D_{yl}$ and $D_{yr}$ in registers $104_l$ and $104_r$, respectively, so as to follow the bit shift of the code C.

A magenta averaging section 105 calculates the magenta left-side mean pixel value data $D_{ml}$ corresponding to the block $B_{lxy}$ and the magenta right-side means pixel value data $D_{mr}$ corresponding to the block $B_{rxy}$ from the magenta block pixel value data $D_m$, and sequentially stores the calculated data $D_{ml}$ and $D_{mr}$ in registers $106_l$ and $106_r$, respectively, so as to follow the bit shift of the code C.

A comparison section 107 compares an n-th bit of the code (n=1, 2, ..., 16 from the leftmost bit of the code) with a bit determination result determined based on the magnitude relationship between the yellow left-side mean pixel value data $D_{yl}$ and the yellow right-side mean pixel value data $D_{yr}$ stored in registers $104_l$ and $104_r$, respectively.

A coefficient registration section 108 registers information about the change in the block mean pixel value of the yellow component corresponding to the magenta left-side mean pixel value data $D_{ml}$ calculated by the magenta averaging section 105. Specifically, the coefficient registration section 108 registers information about coefficients of mathematical formulas (see FIG. 8) employed to change the block mean pixel value of the yellow component (see FIG. 9).

Figures 8, 9:
FIG. 8 is an illustration for explaining a process of setting the difference T for the respective blocks.
FIG. 9 illustrates one example of coefficient information registered in a coefficient registration section.

FIG. 9 illustrates one example of coefficient information registered in the coefficient registration section 108. The magenta left-side mean pixel value data $D_{ml}$, which ranges from "0" to "255", and the coefficients are stored in correlated form.

For instance, in the coefficient information 108a, the magenta left-side mean pixel value data $D_{ml}$ "0 to 25" corresponds to the coefficient "3", the magenta left-side mean pixel value data $D_{ml}$ "26 to 50" corresponds to the coefficient "2", the magenta left-side mean pixel value data $D_{ml}$ "51 to 200" corresponds to the coefficient "1", and the magenta left-side mean pixel value data $D_{ml}$ "201 to 255" corresponds to the coefficient "2".

An encoding section 109 executes a process for embedding the code C into the block division image data I1 based on a result output by the comparison section 107, the magenta left-side mean pixel value data $D_{ml}$ and magenta right-side mean pixel value data $D_{mr}$.

That is, if the result of the comparison section 107 indicates that the n-th bit of the code C matches the bit determination result, the encoding section 109 sets the difference between the yellow left-side mean pixel value data $D_{yl}$ and the yellow right-side mean pixel value data $D_{yr}$ to a predetermined value T, while satisfying the magnitude relationship between the yellow left-side mean pixel value data $D_{yl}$ and the yellow right-side mean pixel value data $D_{yr}$, so as to improve decoding efficiency. If the comparison result indicates otherwise, the encoding section 109 inverts the yellow left-side mean pixel value data $D_{yl}$ and the yellow right-side mean pixel value data $D_{yr}$ so as to satisfy the magnitude relationship and to match the bits of the code C. Thereafter, the encoding section 109 generates and outputs the coded image data I2 (see FIG. 6).

Specifically, if the magnitude relationship $D_{yl}<D_{yr}$ between the yellow left-side mean pixel value data $D_{yl}$ and the yellow right-side mean pixel value data $D_{yr}$ is satisfied, or if the yellow left-side mean pixel value data $D_{yl}$ and the yellow right-side mean pixel value data $D_{yr}$ are inverted to satisfy the magnitude relationship $D_{yl}<D_{yr}$, the encoding section 109 calculates changed yellow left-side mean pixel value data $D'_{yl}$ from the formula (1) for case (A) $D_{yl}<D_{yr}$ and then calculates changed yellow right-side mean pixel value data $D'_{yr}$ from the formula (2), as illustrated in FIG. 7.

The predetermined value T is initialized (e.g., T=T0=10), and the yellow left-side mean pixel value data $D'_{yl}$ and the yellow right-side mean pixel value data $D'_{yr}$ are calculated. Thereafter, using the magenta left-side mean pixel value data $D_{ml}$ and the magenta right-side mean pixel value data $D_{mr}$ calculated by the magenta averaging section 105, the value of T is reset according to conditions illustrated in FIG. 8.

Namely, if (A) $D'_{yl}<D'_{yr}$ and $D_{ml}<D_{mr}$ or if $D'_{yl}>D'_{yr}$ and $D_{ml}>D_{mr}$, the encoding section 109 substitutes the value T from a formula (5) in formulas (1) to (4). If (B) $D'_{yl}<D'_{yr}$ and $D_{ml}D_{mr}$ or if $D'_{yl}>D'_{yr}$ and $D_{ml}D_{mr}$, the encoding section 109 substitutes the value T from a formula (6) in the formulas (1) to (4).

A coefficient in the formula (6) is acquired from the coefficient information 108a illustrated in FIG. 9 and corresponds to the magenta left-side mean pixel value data $D_{ml}$. For instance, case (A) of FIG. 8 corresponds to one in which the coefficient corresponding to each magenta left-side mean-pixel value data $D_{ml}$ is "1".

On the other hand, if the magnitude relationship $D_{yl} D_{yr}$ between the yellow left-side mean pixel value data $D_{yl}$ and the yellow right-side mean pixel value data $D_{yr}$ is satisfied, or if values are inverted to satisfy the magnitude relationship $D_{yl} D_{yr}$, then the encoding section 109 calculates the changed yellow left-side mean pixel value data $D'_{yl}$ from the formula (3) for case (B) $D_{yl} D_{yr}$ and then calculates the changed yellow right-side mean pixel value data $D'_{yr}$ from the formula (4). A method of setting the value T is the same as the method used for (A) $D_{yl}<D_{yr}$ illustrated in FIG. 7.

In this embodiment, in the coefficient information 108a, the magenta left-side mean pixel value data $D_{ml}$ and the coefficient information are stored in correlated form. Alternatively, the magenta right-side mean pixel value data $D_{mr}$, magenta mean pixel value data that is an average of the magenta left-side mean pixel value data $D_{ml}$ and the magenta right-side mean pixel value data $D_{mr}$, and the coefficient information may be stored in correlated form.

If the above alternative is adopted, the coefficient corresponding to the magenta right-side mean pixel value data $D_{ml}$ or the magenta left-side mean pixel value data $D_{mr}$ is extracted from the coefficient information 108a for the paired blocks to be subjected to a pixel value change processing, and the changed yellow left-side mean pixel value data $D'_{yl}$ and the changed yellow right-side mean pixel value data $D'_{yr}$ are calculated based on the coefficient.

Furthermore, the calculation formulas for the yellow left-side mean pixel value data $D'_{yl}$ and the yellow right-side mean pixel value data $D'_{yr}$ explained with reference to FIGS. 7 and 8 are given only as an example, and may be calculated according to the magenta mean pixel value data $D_{ml}$ using other formulas.

The coded image data I2 illustrated in FIG. 6 corresponds to the block division image data I1 illustrated in FIG. 5 and the original image data I0, and includes regions $A_1$ to $A_8$. The same code C (1010110101001010) is embedded into the regions $A_1$ to $A_8$ eight times.

For instance, the region $A_1$ corresponds to the blocks $B_{l11}$, $B_{r11}$, and $Bl_{28}$, $B_{r28}$. The other regions $A_2$ to $A_8$ correspond to the blocks $Bl_{31}$, $B_{r31}$, ..., $Bl_{168}$, $B_{rl68}$.

While FIG. 6 illustrates a state in which the code C has been embedded, the actual coded image data I2 corresponds to image data substantially equal to the original image data I0. The image data cannot be discriminated from the original image data I0 with naked eyes although some blocks having changed densities are often present.

Furthermore, the respective constituent elements of the encoder 100 are connected to one another through a control section, which is not shown in FIG. 1.

Figure 10A:
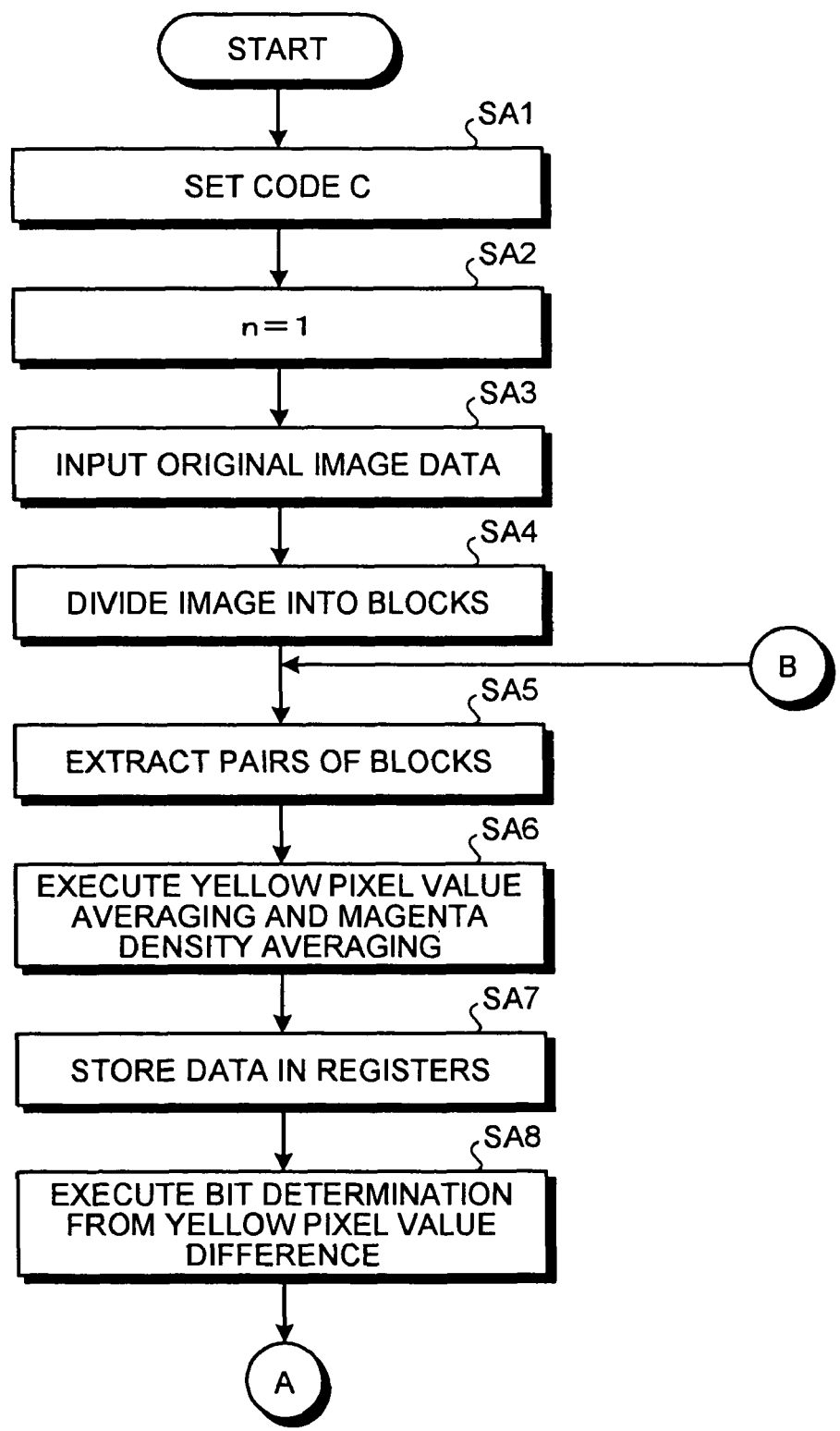
FIG. 10A and FIG. 10B are flowcharts of an operation of the encoder 100.
Figure 10B:
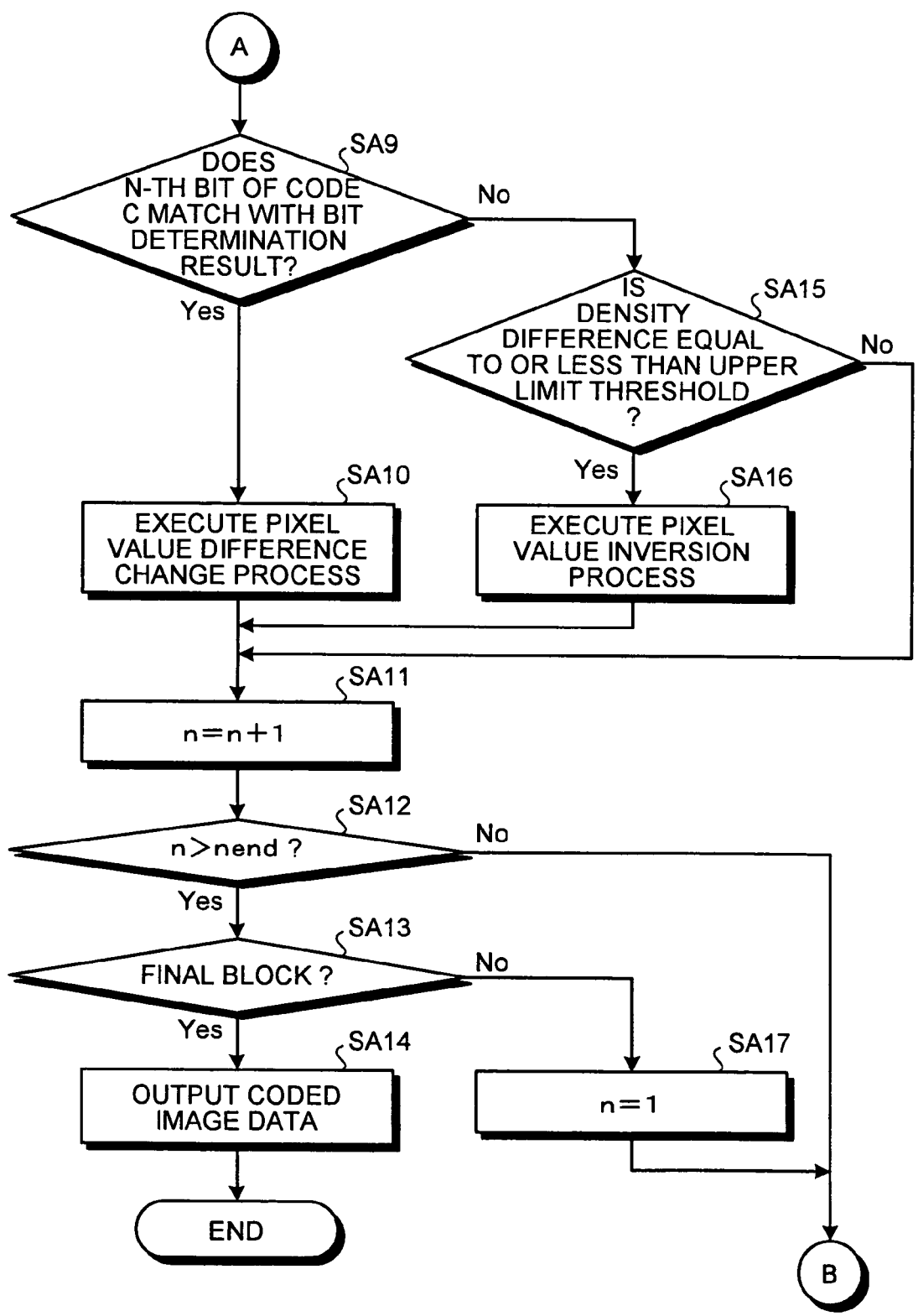

FIGS. 10A and 10B are flowcharts for explaining the operation of the encoder 100.

Referring to FIG. 10A, at step SA1, the code C is set in the comparison section 107. At step SA2, the comparison section 107 initializes n to 1. As explained above, n represents the bit pointer of the code C. In this example, n=1 corresponds to the leftmost bit ("1") of the code C.

At step SA3, the original image data I0 is input to the block division section 101. At step SA4, the block division section 101 divides the original image data I0 into the blocks $B_{l11}$ to $B_{r168}$ in 16 rows by 16 columns as illustrated in FIG. 5, and sends the image data to the block extraction section 102 as the block division image data I1.

At step SA5, the block extraction section 102 extracts paired blocks (the blocks $B_{l11}$ and $B_{r11}$ in this example) corresponding to the value of n (n=1 in this example) from the block division image data I1, and outputs the yellow and magenta component pixel value distribution in the blocks $B_{l11}$ and $B_{r11}$ to the yellow averaging section 103 and the magenta averaging section 105 as the yellow block pixel value data $D_y$ and the yellow block pixel value data $D_m$, respectively.

At step SA6, the yellow averaging section 103 executes an averaging process to calculate the yellow left-side mean pixel value data $D_{yl11}$, corresponding to the block $B_{l11}$ and the yellow right-side mean pixel value data $D_{yr11}$ corresponding to the block $B_{r11}$ from the yellow block pixel value data $D_y$. Similarly, the magenta averaging section 105 executes an averaging process to calculate the magenta left-side mean pixel value data $D_{ml11}$ corresponding to the block $B_{l11}$ and the magenta right-side mean pixel value data $D_{mr11}$ corresponding to the block $B_{r11}$ from the magenta block pixel value data $D_m$.

At step SA7, the yellow averaging section 103 stores the yellow left-side mean pixel value data $D_{yl11}$ and the yellow right-side mean pixel value data $D_{yr11}$ in an L register 104l and an R register 104r, respectively. The magenta averaging section 105 stores the magenta left-side mean pixel value data $D_{ml11}$ and the magenta right-side mean pixel value data $D_{mr11}$ in an L register 106l and an R register 106r, respectively.

At step SA8, the comparison section 107 extracts the leftmost bit of the code C (corresponding to n=1), i.e., "1", calculates the pixel value difference between the yellow left-side mean pixel value data $D_{yl11}$ and the yellow right-side mean pixel value data $D_{yr11}$ stored in registers $104_l$ and $104_r$, respectively, and executes bit determination based on the pixel value difference.

If the yellow left-side mean pixel value data $D_{yl11}$ is higher than the yellow right-side mean pixel value data $D_{yr11}$, the comparison section 107 determines that the bit for the paired block is "1".

As illustrated in FIG. 10B, at step SA9, the comparison section 107 determines whether the n-th bit of the code C matches the bit determination result at the step SA8. In this example, the comparison section 107 determines that the two values match (Yes at step SA9).

At step SA10, the encoding section 109 executes a pixel value difference change process for setting the pixel value difference between the yellow left-side mean pixel value data $D_{yl}$ and the yellow right-side mean pixel value data $D_{yr}$ to T so as to satisfy the magnitude relationship between the yellow left-side mean pixel value data $D_{yl}$ and the yellow right-side mean pixel value data $D_{yr}$. Specifically, the encoding section 109 uses the formulas illustrated in FIGS. 7 and 8 and the coefficient information 108a illustrated in FIG. 9 for setting the pixel value difference to T.

At step SA11, the comparison section 107 increments n by one. As a result, the value of n is two. At step SA12, the comparison section 107 determines whether n is greater than 'nend', where 'nend' is the total number of bits in the code C (16 in this example). Since n is two, the comparison section 107 determines that n is not greater than 'nend' (No at step SA12). Therefore, the process from step SA5 of FIG. 10A is repeated.

The block extraction section 102 extracts the paired blocks $B_{l12}$ and $B_{r12}$ corresponding to n=2 from the block division image data I1, and outputs the yellow and magenta component pixel value distribution in the blocks $B_{l12}$ and $B_{r12}$ to the yellow averaging section 103 and the magenta averaging section 105 as the yellow block pixel value data $D_y$ and the magenta block pixel value data $D_m$, respectively.

At step SA6, the yellow averaging section 103 executes an averaging process to calculate the yellow left-side mean pixel value data $D_{yl12}$ corresponding to the block $B_{l12}$ and the yellow right-side mean pixel value data $D_{yr12}$ corresponding to the block $B_{r12}$ from the yellow block pixel value data $D_y$. Similarly, the magenta averaging section 105 executes an averaging process to calculate the magenta left-side mean pixel value data $D_{ml12}$ corresponding to the block $B_{l12}$ and the magenta right-side mean pixel value data $D_{mr12}$ corresponding to the block $B_{r12}$ from the magenta block pixel value data $D_m$.

At step SA7, the yellow averaging section 103 stores the yellow left-side mean pixel value data $D_{yl12}$ and the yellow right-side mean pixel value data $D_{yr12}$ in the L register $104_l$ and the R register $104_r$, respectively. The magenta averaging section 105 stores the magenta left-side mean pixel value data $D_{ml12}$ and the magenta right-side mean pixel value data $D_{mr12}$ in the L register $106_l$ and the R register $106_r$, respectively.

At step SA8, the comparison section 107 extracts the next bit of the code C (corresponding to n=2), i.e., "0", calculates the pixel value difference between the yellow left-side mean pixel value data $D_{yl12}$ and the yellow right-side mean pixel value data $D_{yr12}$ stored in the registers $104_l$ and $104_r$, respectively, and executes bit determination based on the pixel value difference.

If the yellow left-side mean pixel value data $D_{yl12}$ is lower than the yellow right-side mean pixel value data $D_{yr12}$, the comparison section 107 determines that the bit for the paired blocks is "0".

As illustrated in FIG. 10B, at step SA9, the comparison section 107 determines whether the n-th bit of the code C (second bit or "0") matches the bit determination result ("0") of the step SA8. In this example, the comparison section 107 determines that the two values match (Yes at step SA9).

At step SA10, the encoding section 109 executes a pixel value difference change process for setting the pixel value difference between the yellow left-side mean pixel value data $D_{yl}$ and the yellow right-side mean pixel value data $D_{yr}$ to T so as to satisfy the magnitude relationship between the yellow left-side mean pixel value data $D_{yl}$ and the yellow right-side mean pixel value data $D_{yr}$. Specifically, the encoding section 109 uses the formulas illustrated in FIGS. 7 and 8 and the coefficient information 108a illustrated in FIG. 9 for setting the pixel value difference to T.

At step SA11, the comparison section 107 increments n by one. As a result, the value of n is set to three. At step SA12, the comparison section 107 determines whether n (=3) is greater than 'nend' (=16). The comparison section 107 determines that n (=3) is not greater than 'nend' (No at step SA12). Thereafter, the operation from step SA5 is repeated until n is equal to 17 (Yes at step SA12).

When n is set to 16 at the step SA11, the process jumps to step SA5. The block extraction section 102 extracts the paired blocks $B_{l28}$ and $B_{r28}$ corresponding to n=16 from the block division image data I1, and outputs the yellow and magenta component pixel value distribution in the blocks $B_{l28}$ and $B_{r28}$ to the yellow averaging section 103 and the magenta averaging section 105 as the yellow block pixel value data $D_y$ and the magenta block pixel value data $D_m$, respectively.

At step SA6, the yellow averaging section 103 executes an averaging process to calculate the yellow left-side mean pixel value data $D_{yl28}$ corresponding to the block $B_{l28}$ and the yellow right-side mean pixel value data $D_{yr28}$ corresponding to the block $B_{r28}$ from the yellow block pixel value data $D_y$. Similarly, the magenta averaging section 105 executes an averaging process to calculate the magenta left-side mean pixel value data $D_{ml28}$ corresponding to the block $B_{l28}$ and the magenta right-side mean pixel value data $D_{mr28}$ corresponding to the block $B_{r28}$ from the magenta block pixel value data $D_m$.

At step SA7, the yellow averaging section 103 stores the yellow left-side mean pixel value data $D_{yr28}$ and the yellow right-side mean pixel value data $D_{yr28}$ in the L register $104_l$ and the R register $104_r$, respectively. The magenta averaging section 105 stores the magenta left-side mean pixel value data $D_{ml28}$ and the magenta right-side mean pixel value data $D_{mr28}$ in the L register $106_l$ and the R register $106_r$, respectively.

At step SA8, the comparison section 107 extracts the right-side bit of the code C (corresponding to n=16), i.e., "0", calculates the pixel value difference between the yellow left-side mean pixel value data $D_{yl28}$ and the yellow right-side mean pixel value data $D_{yr28}$ stored in registers $104_l$ and $104_r$, respectively, and executes bit determination based on the pixel value difference.

If the yellow left-side mean pixel value data $D_{yl28}$ is equal to or higher than the yellow right-side mean pixel value data $D_{yr28}$ the comparison section 107 determines that the bit for the paired block is "1".

As illustrated in FIG. 10B, at step SA9, the comparison section 107 determines whether the n-th bit of the code C (16th bit or "0" in this example) matches the bit determination result ("1" in this example) at the step SA8. In this example, the comparison section 107 determines that the two values do not match (No at step SA9).

At step SA15, the comparison section 107 determines whether the pixel value difference (e.g., 10) calculated at the step SA8 is equal to or less than a preset upper limit threshold (e.g., 100). In this example, the comparison section 107 determines that the pixel value difference is equal to or less than the preset upper limit threshold (Yes at step SA15).

At step SA16, the encoding section 109 executes a pixel value inversion process for inverting the magnitude relationship between the yellow left-side mean pixel value data $D_{yl28}$ and the yellow right-side mean pixel value data $D_{yr28}$ so that the bit determination result matches the n-th bit (16th bit of "0" in this example) of the code C.

Namely, the encoding section 109 sets the yellow left-side mean pixel value data $D_{yl28}$ lower than the yellow right-side mean pixel value data $D_{yr28}$ using the formulas illustrated in FIGS. 7 and 8 and the coefficient information 108a illustrated in FIG. 9. If the pixel value difference calculated at step SA8 is greater than the preset upper limit threshold (No at step SA15), then the process at step SA11 is executed without changing the pixel value.

The reason for omitting the change of pixel value is as follows. If the pixel value difference between the paired blocks is large and the pixel value change process is executed, the pixel value change is visually apparent. Therefore, the pixel value is not changed intentionally to prevent image degradation or generating an unnatural image. At step SA11, the comparison section 107 increments n by one. As a result, n is set to 17. At step SA12, the comparison section 107 determines whether n (=17) is greater than 'nend' (=16). In this example, the comparison section 107 determines that n is greater than 'nend' (Yes at step SA12).

At step SA13, the comparison section 107 determines whether the final pair of blocks (blocks $B_{l168}$ and $B_{r168}$) in the block division image data I1 has been processed. In this example, the comparison section 107 determines that the processing is not finished (No at step SA13).

At a step SA17, the comparison section 107 resets n to one. As illustrated in FIG. 10A, at step SA5, the block extraction section 102 extracts the pair of blocks $B_{l31}$ and $B_{r31}$ corresponding to n=1 from the block division image data I1, and outputs the yellow and magenta component pixel value distribution in the blocks $B_{l31}$ and $B_{r31}$ to the yellow averaging section 103 and the magenta averaging section 105 as the yellow block pixel value data $D_y$ and the magenta block-pixel value data $D_m$, respectively.

Thereafter, the operation is repeated until the final block has been processed (Yes at step SA13.

If the determination result of step SA13 is "Yes", the encoding section 109 generates the coded image data I2 based on the determination result of step SA9, the pixel value difference change process of step SA10, the determination result of step SA15, and the pixel value inversion process of step SA16.

Specifically, the encoding section 109 sets the pixel value difference between the yellow left-side mean pixel value data $D_{yl}$ and the yellow right-side mean pixel value data $D_{yr}$ to T for the pair of blocks for which the determination result of the step SA9 is "Yes" so as to satisfy the magnitude relationship between the yellow left-side mean pixel value data $D_{yl}$ and the yellow right-side mean pixel value data $D_{yr}$. In addition, the encoding section 109 generates the coded image data I2 corresponding to the changed yellow left-side mean pixel value data $D_{yl}$ and the changed yellow right-side mean pixel value data $D_{yr}$ for the pair of blocks for which the determination result of the step SA15 is "Yes" based on the pixel value inversion process of the step SA16. A decoder 200 that decodes the coded image data I2 is explained later.

The same code C (1010110101001010) is embedded eight times into the regions $A_1$ to $A_8$ in the coded image data I2 illustrated in FIG. 6.

Figure 11:
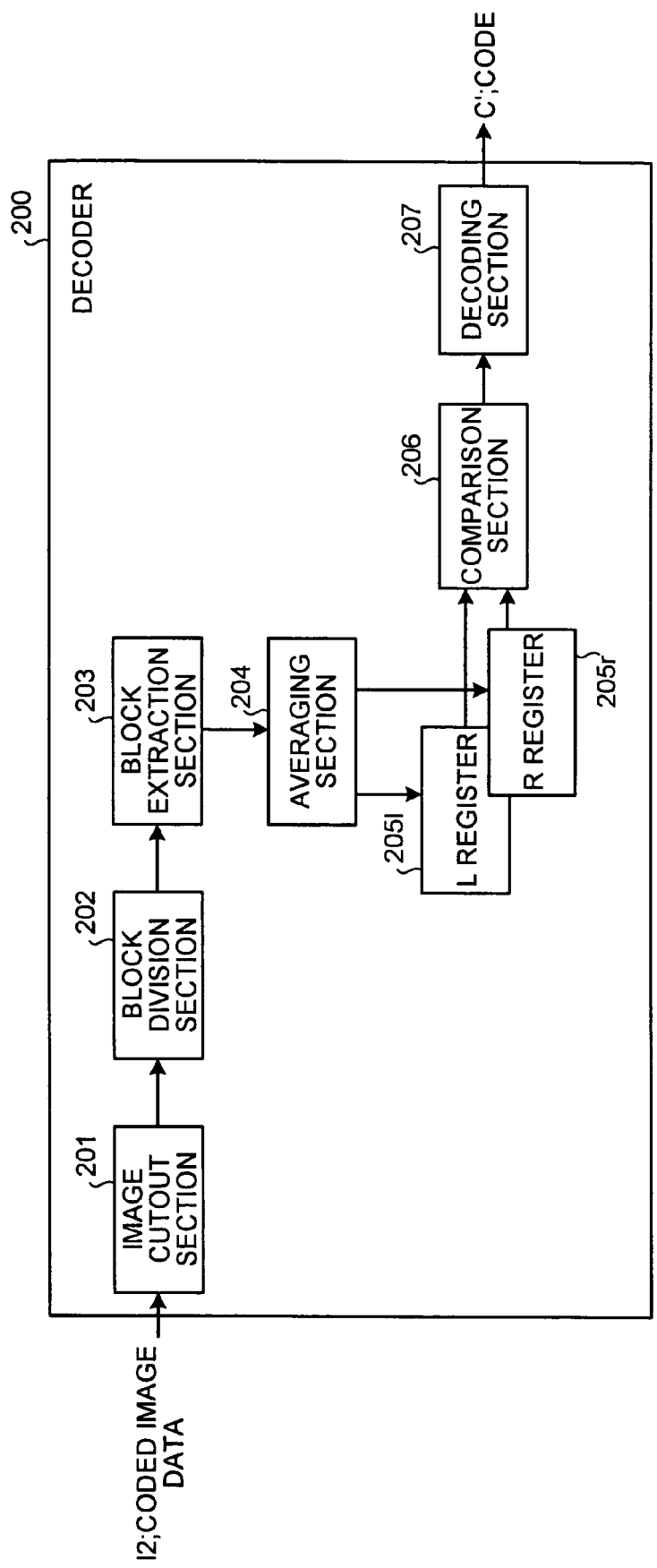
FIG. 11 is a block diagram of a decoder according to the first embodiment.

FIG. 11 is a block diagram of the decoder 200 according to the first embodiment of the present invention. The decoder 200 decodes the embedded code from the coded image data I2, which is encoded by the encoder 100.

If a blank part is present around the coded image data I2, an image cutout section 201 in the decoder 200, cuts out the significant part, which is the coded image data I2, from the entire image data. If only the coded image data I2 is input to the image cutout section 201, data cutout is not performed.

A block division section 202 divides the coded image data I2 into blocks in N rows and M columns (16 rows and 16 columns in FIG. 5), and outputs the blocks as block division image data (not shown), similar to the block division image data I1 illustrated in FIG. 5.

A block extraction section 203, similar to the block extraction section 102 (see FIG. 1), sequentially extracts pairs of blocks (each pair including two adjacent blocks) from the block division image data so as to follow the bit shift of the decoded code (of 16 bits), and sequentially outputs pixel value distribution of the yellow components in the paired blocks (each pair including two adjacent blocks) as yellow block pixel value data (not shown).

However, the yellow block pixel value data includes the yellow components included in the cyan and magenta inks as unnecessary components.

An averaging section 204, similarly to the yellow averaging section 103 (see FIG. 1), calculates yellow left-side mean pixel value data corresponding to the left block and yellow right-side mean pixel value data corresponding to the right block from the yellow block pixel value data, and stores the pixel value in registers 205l and 205r, respectively.

A comparison section 206 determines the magnitude relationship between the yellow left-side mean pixel value data and the yellow right-side mean pixel value data stored in the registers $205_l$ and $205_r$, respectively, thereby executing bit determination, and outputs a code group CG to a decoding section 207. The code group CG includes candidate codes $C_1$ to $C_8$ (see FIG. 12) corresponding to the determination of the bit as "0" or "1" using the relational formulas.

Figure 12:
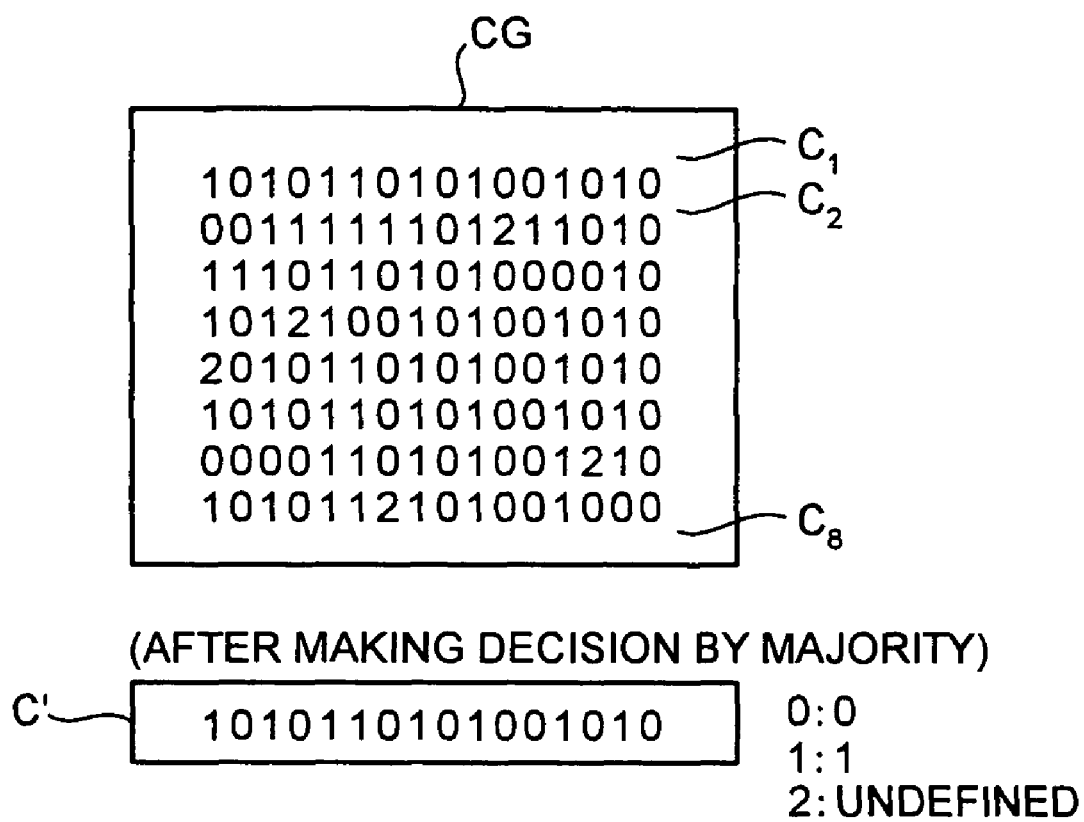
FIG. 12 is an illustration for explaining how the decoder determines the code from a group of candidate codes.

FIG. 12 is an illustration for explaining how the decoder 200 determines the code from a group of candidate codes. Each of the candidate codes $C_1$ to $C_8$ illustrated in FIG. 12 has 16 bits. The codes $C_1$ to $C_8$ are obtained by decoding the codes (each of 16 bits) embedded into the regions $A_1$ to $A_8$ in the coded image data I2, respectively, and are candidates of a code C' to be obtained as a result of decoding performed by the decoder 200.

Further, in each of the candidate codes $C_1$ to $C_8$, "2" represents a bit which is not defined as "1" or "0".

The comparison section compares the bits in the candidate codes $C_1$ to $C_8$ bit by bit. For each bit position, a majority value of the bit is considered as the bit value for the code C'. The decoding section 207 then outputs the code C'.

The respective constituent elements of the decoder 200 are connected to one another through a control section, which is not shown in the figure.

Figure 13:
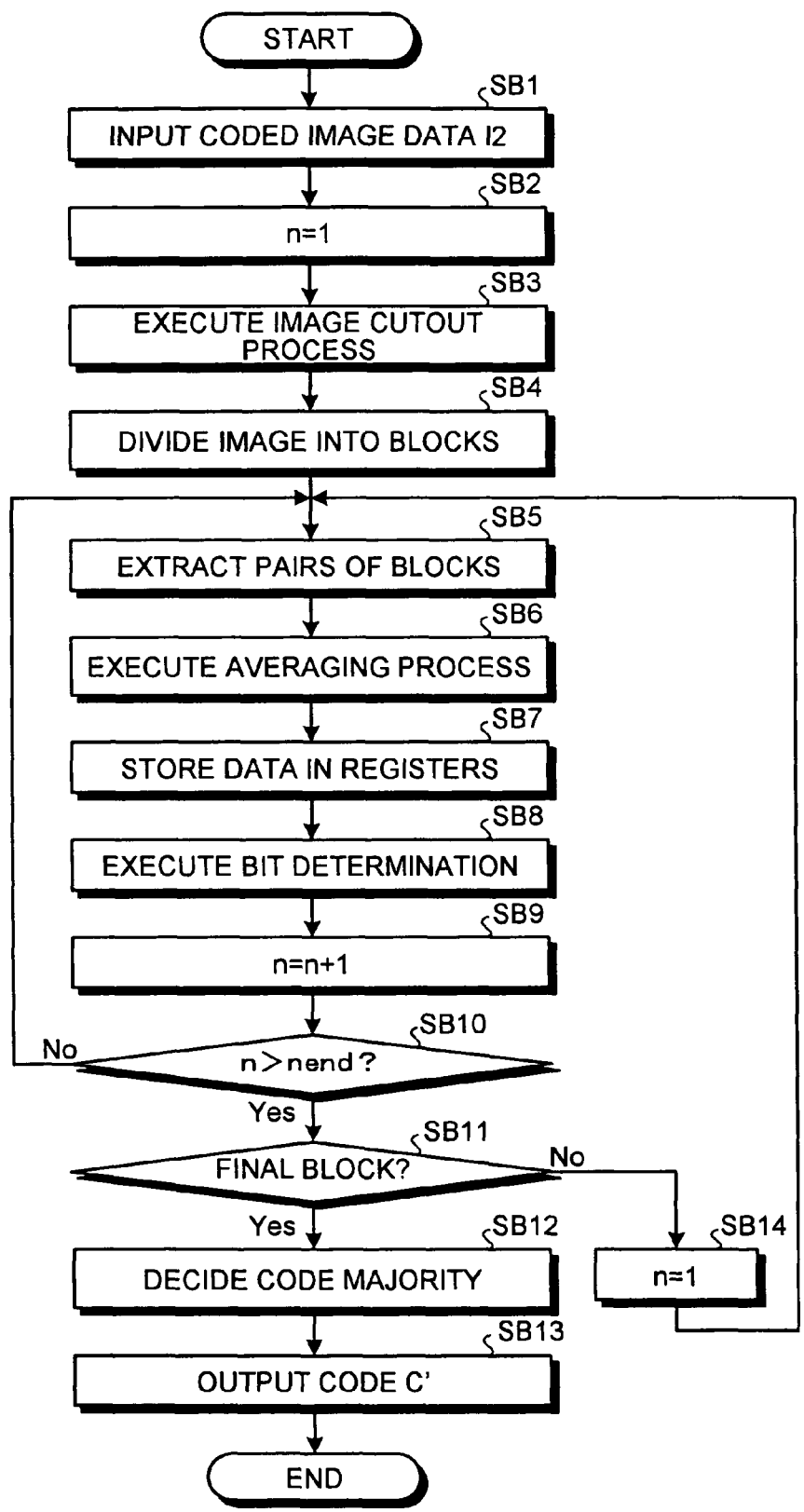
FIG. 13 is a flowchart of an operation of the decoder.

FIG. 13 is a flowchart of an operation of the decoder 200.

At step SB1, the coded image data I2 is input to the image cutout section 201. At step SB2, n is initialized to one, where n represents the bit pointer of the code to be decoded. In this example, n=1 corresponds to the leftmost bit of the code.

At step SB3, if a blank part is present around the coded image data I2, the image cutout section 201 cuts out the significant part, which is the coded image data I2, from the entire image data.

At step SB4, the block division section 202 divides the coded image data I2 into blocks, and sends the blocks to the block extraction section 203 as block division image data.

At step SB5, the block extraction section 203 extracts pairs of blocks corresponding to n=1 from the block division image data, and then outputs yellow pixel value distribution in the respective blocks to the averaging section 204 as yellow block pixel value data.

At step SB6, the averaging section 204 calculates the yellow left-side mean pixel value data corresponding to a left block and the yellow right-side mean pixel value data corresponding to the right block, from the yellow block pixel value data.

At step SB7, the averaging section 204 stores the yellow left-side mean pixel value data in the register $205_l$ and stores the yellow right-side mean pixel value data in the register $205_r$.

At step SB8, the comparison section 206 determines the magnitude relationship between the yellow left-side mean pixel value data and the yellow right-side mean pixel value data stored in the registers $205_l$ and $205_r$, respectively, thereby executing bit determination, and outputs a bit determination result (determination of the bit as "0" or "1" from the relational formulas explained) to the decoding section 207.

At this step, the comparison section 206 calculates the difference between the yellow left-side mean pixel value data and the yellow right-side mean pixel value data. If the pixel value difference is greater than a preset upper limit threshold, the comparison section 206 sets the bit determination result to "2" (undefined: see FIG. 12).

At step SB9, the comparison section 206 increments n by one. As a result, n is set to two. At step SB10, the comparison section 206 determines whether n is greater than 'nend' (=16). In this example, the comparison section 206 determines that n is not greater than 'nend' (No at step SB10).

Thereafter, the operation after the step SB5 is repeated until the determination result of the step SB10 becomes "Yes".

If n is set to 17 at the step SB9, the determination result of the step SB10 becomes "Yes". At this time, the comparison section 206 sets the candidate code $C_1$ with the bits of the bit determination result.

At step SB11, the comparison section 206 determines whether the processing related to the final pair of blocks in the block division image data is complete. In this example, the determination result of the step SB11 is "No".

At step SB14, the comparison section 206 resets n to one. At the step SB5, the block extraction section 203 extracts the next pair of blocks corresponding to n=1 from the block division image data, and then outputs the yellow pixel value distributions in the respective blocks to the averaging section 204 as the yellow block pixel value data.

Thereafter, the operation is repeated until the determination result of the step SB11 becomes "Yes".

If the determination result of the step SB11 becomes "Yes", the decoding section 207 executes a majority decision processing at a step SB12. Namely, at this time, the candidate codes $C_1$ to $C_8$ illustrated in FIG. 12 correspond to the bit determination result.

The decoding section 207 defines each bit of code C' (16 bits in all) by choosing a majority value per bit position in the candidate codes $C_1$ to $C_8$. For example, for the leftmost bits of the candidate codes $C_1$ to $C_8$, there are two "0"s, five "1"s, and one "2", so that the leftmost bit of the code C' is defined as "1" by majority.

At step SB13, the decoding section 207 outputs the code C'. The code C' is assumed to be identical to the code C (see FIG. 1).

As explained above, according to the first embodiment, the coefficient registration section 108 stores in the coefficient information 108a, in a correlated form, the magenta left-side mean pixel value data $D_{ml}$ and the coefficient corresponding to the change quantities of the yellow left-side mean pixel value data $D_{yl}$ and the yellow right-side mean pixel value data $D_{yr}$. The encoding section 109 changes the yellow left-side mean pixel value data $D_{yl}$ and the yellow right-side mean pixel value data $D_{yr}$ according to the magenta left-side mean pixel value data $D_{ml}$ in the pairs of blocks, based on the coefficient information 108a, thereby embedding the code. Therefore, it is possible to deal with the adverse effect of the unnecessary reflected wavelengths of the ink of the color component different from the ink of the color component into which the code is embedded, on the code detection.

Moreover, the encoding section 109 sets one-bit code corresponding to each pair of blocks based on the magnitude relationship between the yellow left-side mean pixel value data $D_{yl}$ and the yellow right-side mean pixel value data $D_{yr}$ for each paired block. Therefore, it is possible to reduce processing load required to embed the code, and without performing FFT. Further, the adverse effect of the unnecessary reflected wavelengths on the code detection is controlled.

Furthermore, the encoding section 109 embeds the code into the yellow component, which has characteristics closer to the ideal characteristics. Therefore, the yellow component does not have a great effect on the cyan and magenta components. Besides, using the fact that the yellow component is inconspicuous, code detection ability can be maintained without degrading the image.

Moreover, the encoding section 109 sets the change quantities of the yellow left-side mean pixel value data $D_{yl}$ and the yellow right-side mean pixel value data $D_{yr}$ based on the magenta left-side mean pixel value data $D_{ml}$. Therefore, the pixel value of the yellow component can be appropriately changed based on the pixel value of the magenta component.

Furthermore, the coefficient of the formula (6), illustrated in FIG. 8, is set by referring to the coefficient information illustrated in FIG. 9. Alternatively, a coefficient may be selected based on a difference in magenta mean pixel value in the pair of blocks. This instance will be explained as the second embodiment.

Figure 14:
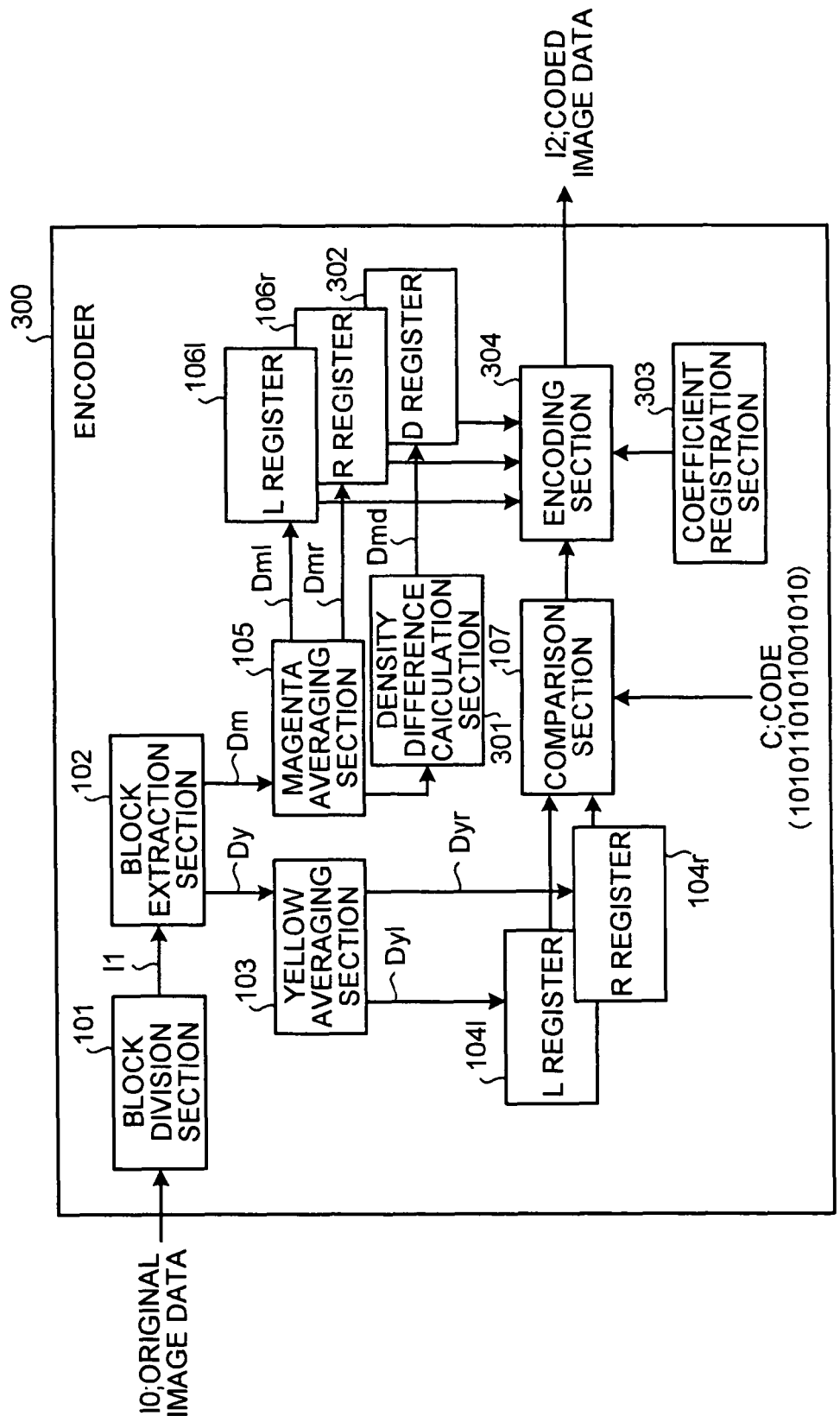
FIG. 14 is a block diagram of an encoder according to a second embodiment.

FIG. 14 is a block diagram of an encoder 300 according to a second embodiment. As a specific example of the image data processing apparatus according to the second embodiment, the encoder 300 that embeds a binary code into an image data and that generates coded image data will be explained. A decoder for reading the code from the coded image data is identical to the decoder 200 illustrated in FIG. 11.

In FIG. 14, sections corresponding to the respective sections illustrated in FIG. 1 are denoted by the same reference symbols and are not explained herein.

In FIG. 14, a pixel value difference calculation section 301 and a D register 302 are provided in the encoder 300. In addition, a coefficient registration section 303 and an encoding section 304 are provided in place of the coefficient registration section 108 and the encoding section 109 of FIG. 1, respectively.

The pixel value difference calculation section 301 calculates an absolute value $|D_{ml}-D_{mr}|$ of the difference between the magenta left-side mean pixel value data $D_{ml}$ and the magenta right-side mean pixel value data $D_{mr}$ calculated by the magenta averaging section 105, as a magenta mean pixel value difference $D_{md}$, and stores the magenta mean pixel value differences $D_{md}$ in the D register 302.

The coefficient registration section 303 stores a change in the yellow component block mean pixel value corresponding to the magenta left-side mean pixel value data $D_{ml}$ and the magenta mean pixel value difference $D_{md}$. Specifically, the coefficient registration section 303 registers information on coefficients of mathematical formulas (see FIGS. 7 and 8) employed to change the block mean pixel value of the yellow component.

FIG. 15 illustrates coefficient information 303a stored in the coefficient registration section 303. In the coefficient information 303a, low-pixel value-side magenta mean densities, magenta mean pixel value differences, and coefficients are registered in correlated form.

For instance, if the magenta mean pixel value difference $D_{md}$ is "0 to 10" for the low-pixel value-side magenta mean pixel value "0 to 25" represented by eight bits, a coefficient "1" is registered corresponding to the magenta mean pixel value difference $D_{md}$. If the magenta mean pixel value difference $D_{md}$ is "11 to 20" for the low-pixel value-side magenta mean pixel value "0 to 25", a coefficient "2" is registered corresponding to the magenta mean pixel value difference $D_{md}$. If the magenta mean pixel value difference $D_{md}$ is "21 to 40" for the low-pixel value-side magenta mean pixel value "0 to 25", a coefficient "3" is registered corresponding to the magenta mean pixel value difference $D_{md}$. If the magenta mean pixel value difference $D_{md}$ is "41 to 255" for the low-pixel value-side magenta mean pixel value "0 to 25", a coefficient "5" is registered corresponding to the magenta mean pixel value difference $D_{md}$. Likewise, for the other low-pixel value-side magenta mean densities, coefficients corresponding to the respective magenta mean pixel value difference $D_{md}$, are registered.

The encoding section 304 executes a process for embedding the code C into the block division image data I1 based on a comparison done by the comparison section 107, the magenta left-side mean pixel value data $D_{ml}$ and magenta right-side mean pixel value data $D_{mr}$ calculated by the magenta averaging section 105, and the magenta mean pixel value difference $D_{md}$ calculated by the mean difference calculation section 301.

Specifically, if the comparison done by the comparison section 107 indicates that the code C matches the bit determination result, the encoding section 304 sets the pixel value difference between the yellow left-side mean pixel value data $D_{yl}$ and the yellow right-side mean pixel value data $D_{yr}$ to the predetermined value T so as to satisfy the magnitude relationship between the yellow left-side mean pixel value data $D_{yl}$ and the yellow right-side mean pixel value data $D_{yr}$. If the values do not match, the encoding section 304 changes the yellow left-side mean pixel value data $D_{yl}$ and the yellow right-side mean pixel value data $D_{yr}$ (inverts the magnitude relationship) so as to satisfy the magnitude relationship representing the bits of the code C. Thereafter, the encoding section 304 generates and outputs the coded image data I2 (see FIG. 6).

Specifically, if the magnitude relationship between the yellow left-side mean pixel value data $D_{yl}$ and the yellow right-side mean pixel value data $D_{yr}$ is $D_{yl}<D_{yr}$, and the magnitude relationship is satisfied, or if the magnitude relationship between the yellow left-side mean pixel value data $D_{yl}$ and the yellow right-side mean pixel value data $D_{yr}$ is inverted to $D_{yl}<D_{yr}$, the encoding section 304 calculates changed yellow left-side mean pixel value data $D'_{yl}$ from the formula (1) for case (A) $D_{yl}<D_{yr}$ illustrated in FIG. 7 and then calculates changed yellow right-side mean pixel value data $D'_{yr}$ from the formula (2).

The predetermined value T is initialized (e.g., T=T0=10), and the yellow left-side mean pixel value data $D'_{yl}$ and the yellow right-side mean pixel value data $D'_{yr}$ are calculated. Thereafter, using the magenta left-side mean pixel value data $D_{ml}$ and the magenta right-side mean pixel value data $D_{mr}$ calculated by the magenta averaging section 105, the value T is corrected according to the conditions illustrated in FIG. 8.

Namely, if (A) $D'_{yl}<D'_{yr}$ and $D_{ml}<D_{mr}$, or if $D'_{yl}>D'_{yr}$ and $D_{ml}>D_{mr}$, the encoding section 304 substitutes the value T from the formula (5) in the formulas (1) to (4). If (B) $D'_{yl}<D'_{yr}$ and $D_{ml}D_{mr}$, or if $D'_{yl}>D'_{yr}$ and $D_{ml}D_{mr}$, the encoding section 304 substitutes the value T from the formula (6) in the formulas (1) to (4).

The coefficient in the formula (6) is determined by referring to the coefficient information 303a illustrated in FIG. 15 and by extracting the coefficient corresponding to the low-pixel value-side magenta mean pixel value of the magenta left-side mean pixel value data $D_{ml}$ and the magenta right-side mean pixel value data $D_{m}r$.

On the other hand, if the magnitude relationship between the yellow left-side mean pixel value data $D_{yl}$ and the yellow right-side mean pixel value data $D_{yr}$ is $D_{yl} D_{yr}$, and the magnitude relationship is satisfied, or if the magnitude relationship between then is reversed to $D_{yl} D_{yr}$, then the encoding section 109 calculates the changed yellow left-side mean pixel value data $D'_{yl}$ from the formula (3) for case (B) $D_{yl} D_{yr}$ and then calculates the changed yellow right-side mean pixel value data $D'_{yr}$ from the formula (4). A method of setting the value T is the same as the method used for (A) $D_{yl}<D_{yr}$ illustrated in FIG. 7.

Figure 16A:
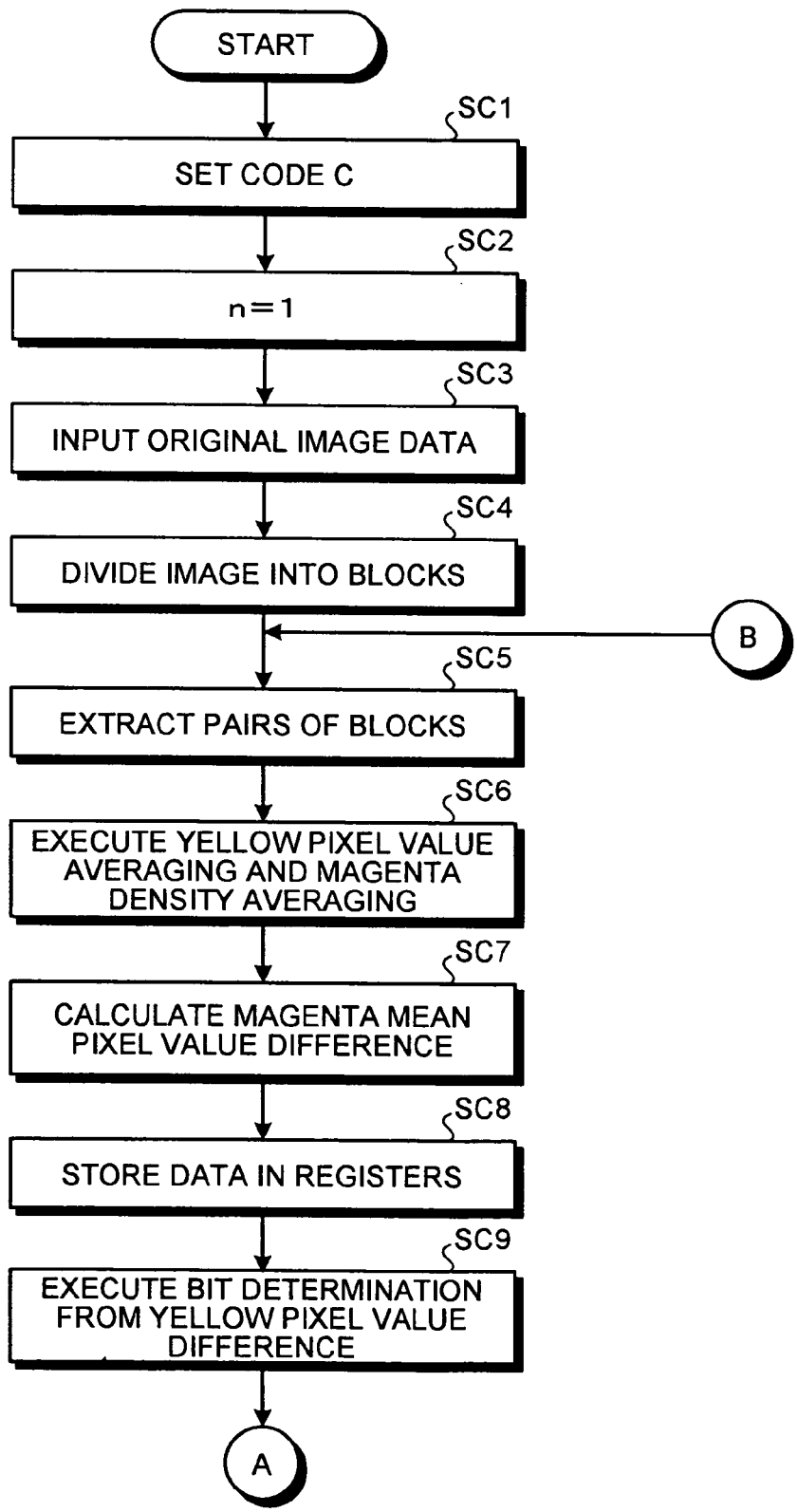
FIG. 16A and FIG. 16B are flowcharts of an operation of the encoder.

An example of an operation of the encoder 300 illustrated in FIG. 14 will next be explained with reference to flowcharts illustrated in FIGS. 16A and 16B. The flowcharts in FIG. 16 and FIG. 10 are different in that a step SC7 in FIG. 16A is added to the flowchart illustrated in FIG. 10A. A step SC8 illustrated in FIG. 16A and steps SC11 and SC17 illustrated in FIG. 16B differ in processing content from the step SA7 illustrated in FIG. 10A and the steps SC10 and SA16 illustrated in FIG. 10B, respectively.

Figure 16B:
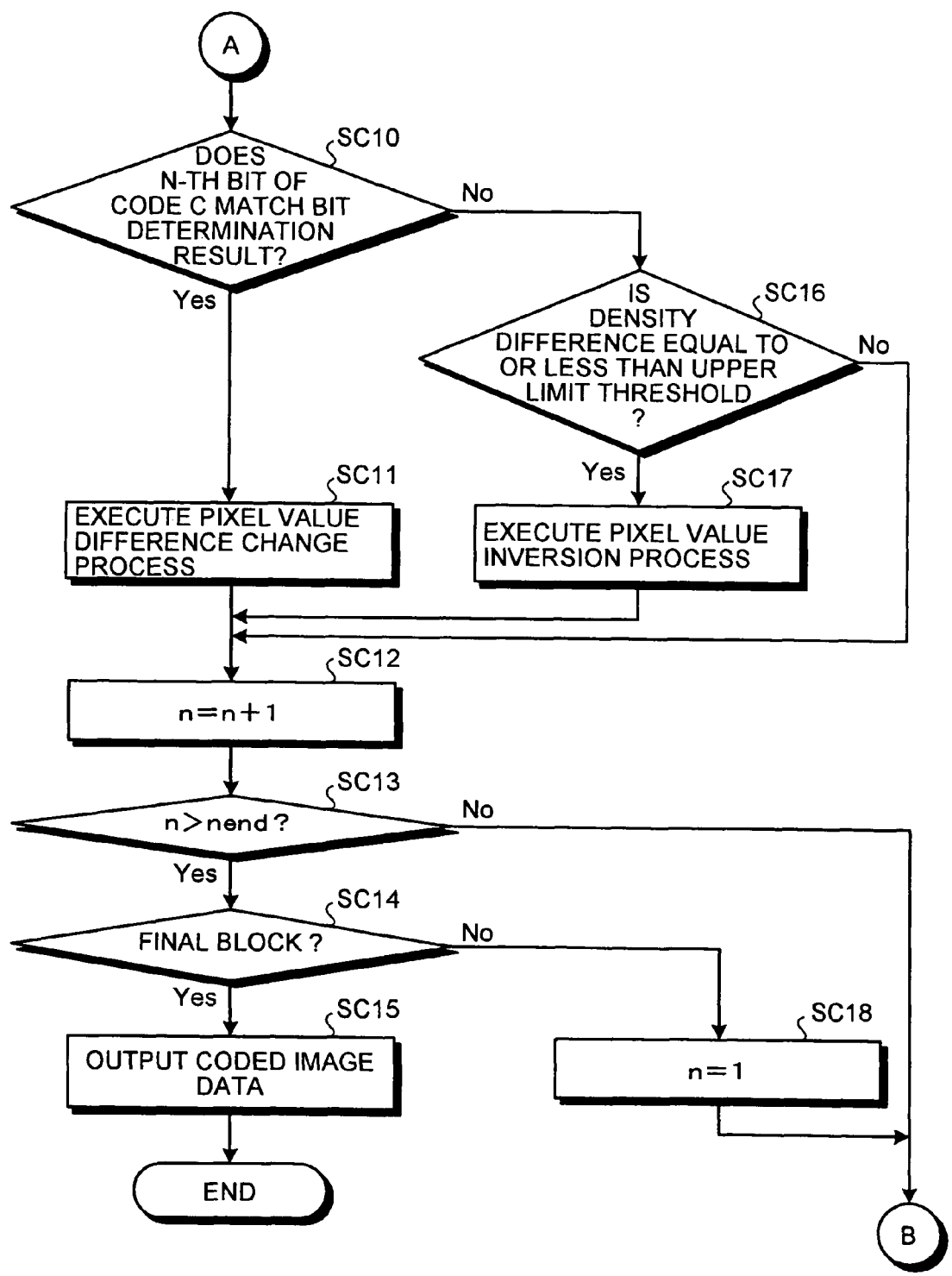

Because steps SC1 to SC6, SC9, S10, SC12 to SC16, and SC18 illustrated in FIGS. 16A and 16B correspond to the steps SA1 to SA6, SA8, SA9, SA11 to SA15, and SA17 illustrated in FIGS. 10A and 10B, respectively, the explanation is omitted herein.

At step SC7 illustrated in FIG. 16A, the pixel value difference calculation section 301 calculates the absolute value $|D_{ml}-D_{mr}|$ of the difference between the magenta left-side mean pixel value data $D_{ml}$ and the magenta right-side mean pixel value data $D_{mr}$ calculated by the magenta averaging section 105, as the magenta mean pixel value difference $D_{md}$.

At step SC8, the yellow averaging section 103 stores the yellow left-side mean pixel value data $D_{yl}$ and the yellow right-side mean pixel value data $D_{yr}$ in the L register $104_l$ and the R register $104_r$, respectively. The magenta averaging section 105 stores the magenta left-side mean pixel value data $D_{ml}$ and the magenta right-side mean pixel value data $D_{mr}$ in the L register $106_l$ and the R register $106_r$, respectively. The pixel value difference calculations section 301 stores the magenta mean pixel value difference data $D_{md}$ in the D register 302.

At step SC11 illustrated in FIG. 16B, the encoding section 109 executes a pixel value difference change process for setting the pixel value difference between the yellow left-side mean pixel value data $D_{yl}$ and the yellow right-side mean pixel value data $D_{yr}$ to T so as to satisfy the magnitude relationship between the yellow left-side mean pixel value data $D_{yl}$ and the yellow right-side mean pixel value data $D_{yr}$, using the formulas illustrated in FIGS. 7 and 8 and the coefficient information 303a illustrated in FIG. 15.

At step SC17, the encoding section 304 executes a pixel value inversion process for inverting the magnitude relationship between the yellow left-side mean pixel value data $D_{yl}$ and the yellow right-side mean pixel value data $D_{yr}$ so that the bit determination result based on the magnitude relationship between the yellow left-side mean pixel value data $D_{yl}$ and the yellow right-side mean pixel value data $D_{yr}$ matches the n-th bit of the code C.

Namely, using the formulas illustrated in FIGS. 7 and 8 and the coefficient information 303a illustrated in FIG. 15, the encoding section 304 inverts the magnitude relationship between the yellow left-side mean pixel value data $D_{yl}$ and the yellow right-side mean pixel value data $D_{yr}$.

As explained above, according to the second embodiment, the coefficient registration section 303 registers, as the coefficient information 303a, the low-pixel value-side magenta mean pixel value data as the lower value of the magenta left-side mean pixel value data $D_{ml}$ and the magenta right-side mean pixel value data $D_{mr}$, the magenta mean pixel value difference $D_{md}$, the coefficients related to the change quantities of the yellow left-side mean pixel value data $D_{yl}$ and the yellow right-side mean pixel value data $D_{yr}$. The encoding section 304 changes the yellow left-side mean pixel value data $D_{yl}$ and the yellow right-side mean pixel value data $D_{yr}$ according to the low-pixel value-side magenta mean pixel value data and the magenta mean pixel value difference $D_{md}$ in the pairs of blocks using the registered coefficient information 303a, thereby embedding the code. Therefore, it is possible to avoid the adverse effect of the unnecessary reflected wavelengths of the ink of the color component different from the ink of the color component into which the code is embedded, on the code detection.

The embodiments of the present invention have been explained with reference to the drawings in detail. However, specific constitutional examples are not limited to these embodiments, and even changes and the like in design made within the scope of the present invention are included in the present invention.

Figure 17:
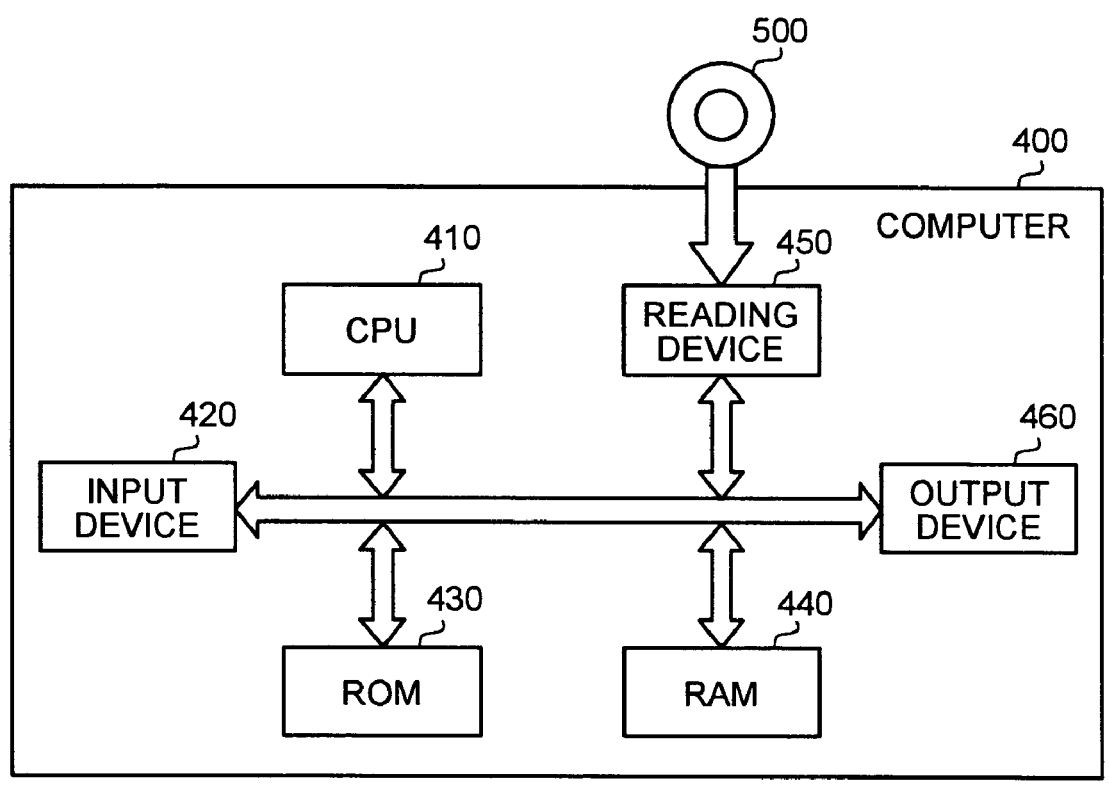
FIG. 17 illustrates a configuration of a modification of the embodiments of the present invention.

For instance, FIG. 17 illustrates a configuration of a modification of the embodiments of the present invention. A program for realizing functions of the encoder 100, the decoder 200, and the encoder 300 may be recorded on a computer readable recording medium 500. The program recorded on the recording medium 500 may be read and executed by a computer 400, whereby the respective functions may be realized.

The computer 400 includes a CPU (Central Processing Unit) 410 that executes the program, an input device 420 such as a keyboard and a mouse, a ROM (Read Only Memory) 430 that stores data, a RAM (Random Access Memory) 440 that stores operation parameters and the like, a reading device 450 that reads the program from the recording medium 500, and an output device 460 such as a display and a printer.

The CPU 410 reads the program recorded on the recording medium 500 through the reading device 450, executes the program, and thereby realizes the functions. Examples of the recording medium 500 include an optical disk, a flexible disk, and a hard disk. This program may be introduced into the computer 400 through a network such as the Internet.

According to the first and the second embodiments, if the n-th bit of the code C coincides with the bit determination result determined from the magnitude relationship between the yellow left-side mean pixel value data $D_{yl}$ and the yellow right-side mean pixel value data $D_{yr}$, the pixel value difference between the yellow left-side mean pixel value data $D_{yl}$ and the yellow right-side mean pixel value data $D_{yr}$ is set to the predetermined value T while keeping the magnitude relationship between the yellow left-side mean pixel value data $D_{yl}$ and the yellow right-side mean pixel value data $D_{yr}$ so as to improve decoding efficiency. However, the present invention is not limited to the embodiments, and the processing may be omitted so as to improve processing speed.

Further, according to the first and the second embodiments, the effect of the magenta component on the yellow component has been considered. However, the present invention is not limited to the embodiments and may be applied to a combination of the other color components. Furthermore, the effect of the cyan component and that of the black component on the yellow component besides the effect of the magenta component may be also considered.

According to the present invention, it is possible to avoid the adverse effect of the unnecessary reflected wavelengths of the ink of the color component different from the ink of the color component into which the code is embedded, on the code detection.

Furthermore, it is possible to reduce a processing load required to embed the code without performing the FFT.

Moreover, it is possible to maintain code detection ability without degrading the image.

Furthermore, it is possible to appropriately change the pixel value of the yellow component based on the pixel value of the magenta component that greatly affects the reflected wavelengths of the yellow component.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image data processing apparatus comprising:
   a dividing unit that divides image data into a plurality of blocks;
   a block extracting unit that extracts a pair of blocks from the divided blocks;
   an index extracting unit that extracts two feature indices of a first color component and two feature indices of a second color component which differs from the first color component from the pair of blocks, one of the two feature indices being extracted from one of the pair of blocks and the other of the two feature indices being extracted from the other of the pair of blocks; and
   a code embedding unit that embeds a code into the pair of blocks, by changing at least one of the extracted two feature indices of the first color component of the pair of blocks based on a magnitude relationship between the extracted two feature indices of the second color component of the pair of blocks and a value determined by at least one of the extracted two feature indices of the second color component.

2. The image data processing apparatus according to claim 1, wherein the first color component is a yellow component.

3. The image data processing apparatus according to claim 2, wherein the second color component is a magenta component.

4. The image data processing apparatus according to claim 1, further comprising a code extracting unit that extracts the code embedded into the image data.

5. A method of processing image data comprising:
dividing image data into a plurality of blocks;
extracting a pair of blocks from the plurality of blocks;
extracting two feature indices of a first color component and two feature indices of a second color component which differs from the first color component from the pair of blocks, one of the two feature indices being extracted from one of the pair of blocks and the other of the two feature indices being extracted from the other of the pair of blocks; and
embedding, by a computer processor, a code into the pair of blocks of the image data, by changing at least one of the extracted two feature indices of the first color component of the pair of the blocks based on a magnitude relationship between the extracted two feature indices of the second color component of the pair of blocks and a value determined by at least one of the extracted two feature indices of the second color component.

6. The method according to claim 5, wherein the first color component is a yellow component.

7. The method according to claim 6, wherein the second color component is a magenta component.

8. The method according to claim 5, further comprising extracting the code embedded into the image data.

9. A computer-readable recording medium that stores a computer program that, when executed by a computer, makes the computer perform a process comprising:
dividing image data into a plurality of blocks;
extracting a pair of blocks from the divided block;
extracting two feature indices of a first color component and two feature indices of a second color component which differs from the first color component from the pair of blocks, one of the two feature indices being extracted from one of the pair of blocks and the other of the two feature indices being extracted from the other of the pair of blocks; and
embedding a code into the pair of blocks of the image data, by changing at least one of the extracted two feature indices of the first color component of the pair of blocks based on a magnitude relationship between the extracted two feature indices of the second color component of the pair of blocks and a value determined by at least one of the extracted two feature indices of the second color component.

10. The computer-readable recording medium according to claim 9, wherein the first color component is a yellow component.

11. The computer-readable recording medium according to claim 10, wherein the second color component is a magenta component.

12. The computer-readable recording medium according to claim 9, further making the computer perform extracting the code embedded into the image data.

13. An embedding unit that is included in an image data processing apparatus
wherein
the embedding unit embeds a code into a pair of blocks, the pair of blocks being extracted from divided into blocks of image data, by changing at least one of extracted two feature indices of a first color component, the two feature indices of the first color component being extracted from the pair of blocks, based on a magnitude relationship between extracted two feature indices of a second color component different from the first color component and extracted from the other block of the pair of blocks and a value determined by at least one of the extracted two feature indices of the second color component.

14. A method of configuring an embedding unit that is included in an image data processing apparatus for embedding a code into an image data, comprising:
configuring a computer processor in the image processing apparatus to execute:
dividing image data into a plurality of blocks;
extracting a pair of blocks from the plurality of blocks; and
extracting two feature indices of a first color component and two feature indices of a second color component which differs from the first color component from the pair of blocks, one of the two feature indices being extracted from one of the pair of blocks and the other of the two feature indices being extracted from the other of the pair of blocks, wherein
the embedding includes embedding the code into the pair of blocks of the image data, by changing at least one of the extracted two feature indices of the first color component of the pair of the blocks based on a magnitude relationship between the extracted two feature indices of the second color component of the pair of blocks and a value determined by at least one of the extracted two feature indices of the second color component.

15. A computer-readable recording medium that stores a computer program, that when executed by a computer, makes the computer perform embedding a code into image data comprising:
dividing the image data into a plurality of blocks;
extracting a pair of blocks from the divided block; and
extracting two feature indices of a first color component and two feature indices of a second color component which differs from the first color component from the pair of blocks, one of the two feature indices being extracted from one of the pair of blocks and the other of the two feature indices being extracted from the other of the pair of blocks, wherein
the embedding includes embedding the code into the pair of blocks of the image data, by changing at least one of the extracted two feature indices of the first color component of the pair of blocks based on a magnitude relationship between the extracted two feature indices of the second color component of the pair blocks and a value determined by at least one of the extracted two feature indices of the second color component.

* * * * *